United States Patent
Ito et al.

(10) Patent No.: US 7,711,180 B2
(45) Date of Patent: May 4, 2010

(54) THREE-DIMENSIONAL IMAGE MEASURING APPARATUS AND METHOD

(75) Inventors: Tadayuki Ito, Tokyo (JP); Hitoshi Otani, Tokyo (JP); Nobuo Kochi, Tokyo (JP)

(73) Assignee: Topcon Corporation, Tokyo (JP)

( * ) Notice: Subject to any disclaimer, the term of this patent is extended or adjusted under 35 U.S.C. 154(b) by 1039 days.

(21) Appl. No.: 11/109,876

(22) Filed: Apr. 20, 2005

(65) Prior Publication Data

US 2005/0271264 A1    Dec. 8, 2005

(30) Foreign Application Priority Data

Apr. 21, 2004    (JP)    ............................. 2004-126090

(51) Int. Cl.
*G06K 9/00* (2006.01)
*G06K 9/32* (2006.01)
*G06K 9/36* (2006.01)
*G06T 15/00* (2006.01)
*G01B 7/00* (2006.01)
*G01B 15/00* (2006.01)

(52) U.S. Cl. ...................... 382/154; 382/285; 382/286; 382/291; 345/419; 702/155

(58) Field of Classification Search ................. 382/154, 382/286
See application file for complete search history.

(56) References Cited

U.S. PATENT DOCUMENTS 5,862,252 A * 1/1999 Yamamoto et al. .......... 382/154

(Continued)

FOREIGN PATENT DOCUMENTS

JP    06-307853 A    11/1994

(Continued)

OTHER PUBLICATIONS

Hao et al., "Image Search Using Multiresolution Matching with a Mutual Information Model", IEEE Proceedings of the 5th International Conference on Signal Processing, vol. 2, Aug. 21-25, 2000, pp. 951-954.*

(Continued)

*Primary Examiner*—Andrew W Johns
*Assistant Examiner*—Jose M Torres
(74) *Attorney, Agent, or Firm*—Foley & Lardner LLP

(57) ABSTRACT

The present invention provides a three-dimensional image measuring apparatus and method capable of measuring projections and depressions on a surface of an object with fine precision, as well as ensuring stable convergence, even for stereo images with significant project distortion. The apparatus includes an area setting section 56 for setting a reference area 57 in one image 53 of a pair of stereo images 46 and a search area 58 in the other image 54 in a position corresponding to the reference area 57, a search image distortion correcting section 62 for applying an image distortion correction to either one of the one image 53 or the other image 54 according to the positional relationship between the reference area 57 and the search area 58 corresponding to the reference area 57, and an area shape measuring section 66 for measuring a shape of a measuring object 41 photographed in the stereo images 46 based on the reference area 57 in the one image 53 and the search area 58 in the other image 54, either one of which has been corrected by the search image distortion correcting section 62.

9 Claims, 18 Drawing Sheets

U.S. PATENT DOCUMENTS

| | | | |
|---|---|---|---|
| 7,043,056 B2* | 5/2006 | Edwards et al. | 382/103 |
| 7,206,080 B2* | 4/2007 | Kochi et al. | 356/611 |
| 7,471,809 B2* | 12/2008 | Miyazaki | 382/107 |

FOREIGN PATENT DOCUMENTS

| | | |
|---|---|---|
| JP | 11-236716 A | 8/1999 |
| JP | 2002-352224 A | 12/2002 |
| JP | 2003-065737 A | 3/2003 |

OTHER PUBLICATIONS

Faugeras et al., "Real time correlation-based stereo: algorithm, implementations and applications", INRIA Research Report, 1993.*

Gong et al., "Multi-resolution Stereo Matching Using Genetic Algorithm", Proceedings of the IEEE Workshop on Stereo and Multi-Baseline Vision, 2001.*

Zhang et al., "A Stereo Matching Algorithm Based on Multiresolution and Epipolar Constratint", IEEE Proceedings of the 3rd International Conference on Image and Graphics, 2004.*

Chien, S. et al., "Fast Disparity Estimation Algorithm for Mesh-Based Stereo Image/video Compression with Two-Stage Hybrid Approach," Proceedings of the SPIE, vol. 5150, No. 1, 2003, pp. 1521-1530.

Porikli, F.M. et al., "Adaptive Stripe Based Patch Matching for Depth Estimation," IEEE, 1997, vol. 4, Apr. 21, 1997, pp. 2905-2908.

Wu, W. et al., "A Stereo Matching Method with Deformable Window and its Application to 3D Measurement of Human Face," Proceedings of the SPIE, 2000, vol. 4067, pp. 378-388.

Lee, H. et al., "Adaptive Hierarchical Stereo Matching Using Object Segmentation and Window Warping" Proceedings of the SPIE, vol. 4660, Jan. 21, 2002, pp. 358-366.

* cited by examiner

FIG. 2

(LEFT IMAGE)     (RIGHT IMAGE)

54: SEARCH IMAGE     53: REFERENCE IMAGE (U,V) ← 58     ← 57

MATCHING METHOD USING
NORMALIZED CORRELATION COEFFICIENT

PYRAMID STRUCTURE

FIG. 7
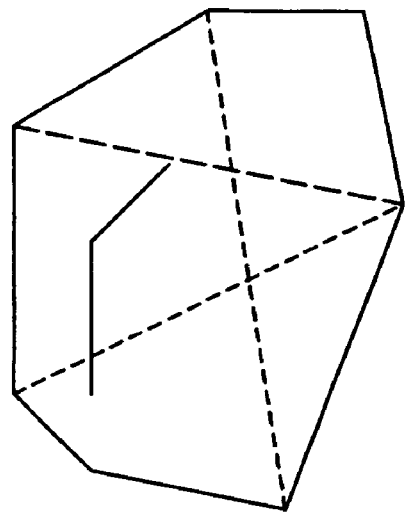
(B) RIGHT IMAGE (REFERENCE IMAGE)
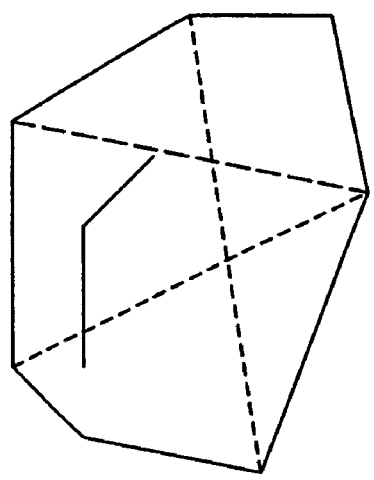
(A) LEFT IMAGE (SEARCH IMAGE)

FIG. 10
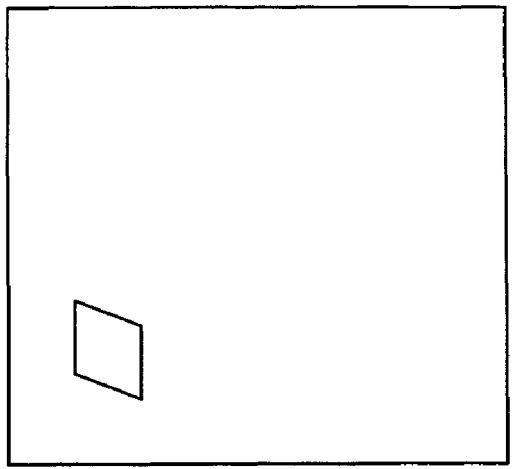
(B) AFTER CORRECTION OF SEARCH IMAGE DISTORTION
$X = a1x + a2y + a3$
$Y = a4x + a5y + a6$
a1 – a6 ARE OBTAINED BASED ON TIN
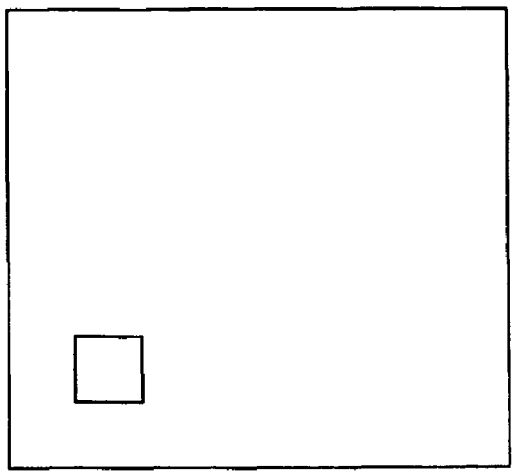
(A) BEFORE CORRECTION OF SEARCH IMAGE DISTORTION 58 (which will hereinafter be used as a generic term for 58a, 58b, . . . ) in the other image 54 (which will hereinafter be used as a generic term for 54a, 54b, . . . ) in a position corresponding to the reference area 57; a search image distortion correcting section 62 for applying an image distortion correction to either one of the images according to positional relationship between the reference area 57 and the search area 58 corresponding to the reference area 57; and an area shape measuring section 66 for measuring a shape of a measuring object 41 photographed in the stereo images 46 based on the reference area 57 in the one image 53 and the search area 58 in the other image 54, to either one of which the image distortion correction has been applied.

With this configuration, the image search area setting section 56 sets a reference area 57 in one image 53 of a pair of stereo images 46 and a search area 58 in the other image 54 in a position corresponding to the reference area 57, as a preprocess for obtaining the positional relationship with respect to the search area 58 corresponding to the reference area 57. The search image correcting section 62 applies an image distortion correction to either one of the one image 53 or the other image 54 according to the positional relationship between the reference are 57 and the search area 58 corresponding to the reference area 57, so that the positional correspondence can be easily achieved in consideration of image distortion included in the pair of stereo images 46 and attributable to the distortion of the optical system, image blur, the shadow on the measuring object 41 and the like. The area shape measuring section 66 measures a shape of the measuring object 41 photographed in the stereo images 46 based on the reference area 57 in the one image 53 and the search area 58 in the other image 54, either one of which has been corrected by the search image distortion correcting section 62.

Preferably, the three-dimensional image measuring apparatus of the present invention may further comprise, as shown in FIG. 1 for example, a unitary geometric shape network forming section 60 for forming a unitary geometric shape network that covers the one image 53 and the other image 54 of the stereo images 46 by duplicating a unitary geometric shape two-dimensionally, wherein the reference area 57 and the search area 58 set by the image search area setting section 56 are of the unitary geometric shape, and the search image distortion correcting section 62 corrects a distortion of the search area 58 with respect to the reference area 57. When the one image 53 and the other image 54 of the stereo images 46 are covered with a unitary geometric shape network, grid points of the unitary geometric shape and with a generally uniform density are distributed over the entire region of the one image 53 and the other image 54 covered with the unitary geometric shape network. The search image distortion correcting section 62 corrects the distortion of the search area 58 with respect to the reference area 57 over the entire region covered with the unitary geometric shape network, thereby distributing the image distortion to the respective grid points of the unitary geometric shape. This allows the area shape measuring section 66 to yield reasonable results from the measurement of a shape of the measuring object 41 photographed in the stereo images 46.

Preferably, the three-dimensional image measuring apparatus of the present invention, may further comprise, as shown in FIG. 1 for example, a corresponding area determining section 64 for determining, by a correlation process, a corresponding reference area 59 (which will hereinafter be used as a generic term for 59a, 59b, . . . ) corresponding to the reference area 57 set by the image search area setting section 56, wherein the image search area setting section 56 sets the corresponding reference area 59 obtained by the correspond-

THREE-DIMENSIONAL IMAGE MEASURING APPARATUS AND METHOD

BACKGROUND OF THE INVENTION

1. Technical Field

The present invention relates to a three-dimensional image measuring apparatus and method for acquiring three-dimensional shape data on a measuring object using photographed image data. The present invention is directed to image measurement of measuring objects at short to middle distances, where significant projection distortion occurs in images photographed in stereo, rather than long-distance objects such as in aerial photography.

2. Related Art

Methods for obtaining 3D data on a working object, a manufacturing object or geographic features include an approach using a measuring instrument (total station) that obtains 3D data at points based on the distance and angle to an object, a motor-driven measuring instrument that acquires data in a surface manner by scanning with a beam, or a laser scanner that acquires data by rapidly oscillating a laser beam.

Meanwhile, other methods include a stereo image measurement approach, in which 3D data is obtained at points or in a surface manner by stereo measurement of stereo images photographed using an object and a comparative calibration body.

Both approaches have an advantage of being able to obtain 3D data in a non-contact manner.

In the former approach, 3D data can be automatically acquired simply when the installation is complete. However, since the bare information which can be acquired includes no image but only distance data and angle data, the details of the measuring object and its surroundings cannot be known. Thus, another instrument needs to be used to photograph an image and affix the image to the distance data. The former approach also involves a serious problem of disturbance noise due to long hours of installation for measurement.

In the latter approach, cameras perform the photographing only momentarily, which causes no problem of disturbance noise. In addition, since images are used in the measurement, there is no need to affix images afterward.

However, measuring objects with significant projections and depressions are difficult to measure in both approaches.

It has become apparent with the latter approach, that photographed images of some measuring objects, in particular at short to middle distances, are not a little affected by projection distortion due to their projections and depressions, and that it is therefore difficult to perform precise three-dimensional position measurement using such images.

The present invention has been made to solve the above-mentioned problem, and therefore has an object to provide a three-dimensional image measuring apparatus and method capable of measuring projections and depressions on a surface of an object with fine precision, as well as ensuring stable convergence, even for stereo images with significant project distortion.

SUMMARY OF THE INVENTION

In order to achieve the above object, a three-dimensional image measuring apparatus of the present invention comprises, as shown in FIG. 1 for example, an image search area setting section 56 for setting a reference area 57 (which will hereinafter be used as a generic term for 57a, 57b, . . . ) in one image 53 (which will hereinafter be used as a generic term for 53a, 53b, . . . ) of a pair of stereo images 46 and a search area ing area determining section 64 as the search area 58 in the other image 54 corresponding to the reference area 57.

Preferably, in the three-dimensional image display apparatus of the present invention, the search image distortion correcting section 62 may be configured to determine an image distortion correction amount applied to an adjacent search area positioned near the search area 58 based on information on the adjacent search area corresponding to an adjacent reference area.

Preferably, in the three-dimensional image display apparatus of the present invention as shown in FIG. 1 and FIG. 4 for example, the unitary geometric shape network forming section 60 may form coarse to fine geometric shapes and bay be configured to sequentially form a finer geometric shape from a coarser geometric shape for an image distortion correction. With this configuration, an approximate image distortion correction is performed with a coarse geometric shape, and then a more precise image distortion correction is performed with a finer geometric shape, using the results of the approximate image distortion correction. In this manner, reliable image distortion correction can be performed with a small amount of calculation.

Preferably, in the three-dimensional image display apparatus of the present invention, the search image distortion correcting section 62 may be configured to determine an image distortion correction amount applied to each search area provided in the other image 54 such that image distortions in the one image 53 and the other image 54 of the pair of stereo images 46 are equal to each other.

In order to achieve the above object, a three-dimensional image measuring method of the present invention, implemented on a computer, comprises, as shown in FIG. 6 for example, the steps of: forming a unitary geometric shape network (step S106) that covers one image 53 and the other image 54 of a pair of stereo images 46 by duplicating a unitary geometric shape two-dimensionally; correcting the other image 54 (steps S110, S112) using an image distortion correction amount obtained from positional relationship between the one image 53 and the other image 54 of the stereo images 46 of the unitary geometric shape network; setting a reference area 58 in the one image 53 of the pair of stereo images 46 and a search area 58 in the other image 54 of the stereo images 46 in a position corresponding to the reference area 57 (step S116); obtaining positional relationship between the reference area 57 and the search area 58 corresponding to the reference area 57 (step S118), using the one image 53 and the other image 54 corrected by the image distortion correction amount; and measuring a shape of a measuring object photographed in the stereo images 46 (step S126) based on the reference area in the one image 53 on which the unitary geometric shape network is formed and the search area 58 in the other image 54 which has been corrected.

In order to achieve the above object, a three-dimensional image measuring apparatus of the present invention comprises, as shown in FIG. 15 for example, an image search area setting section 56 for setting a reference area 57 in one image 53 of a pair of stereo images 46 and a search area 58 in the other image 54 in a position corresponding to the reference area 57; a reference area deforming section 72 for deforming the reference area 57 in at least one of size or shape; a corresponding area determining section 74 for determining, by a correlation process, the search area 58 corresponding to the reference area 57 set by the image search area setting section 56 or deformed by the reference area deforming section 72; a search image distortion correcting section 62 for applying a predetermined image distortion correction to the other image 54 according to positional relationship between the reference area 57 and the search area 58 corresponding to the reference area 57; and an area shape measuring section 80 for measuring a shape of a measuring object 41 photographed in the stereo images 46 based on the reference area 57 in the one image 53 and the search area 58 in the other image 54 corrected by the search image distortion correcting section 62.

Preferably, the three-dimensional image measuring apparatus of the present invention may further comprise as shown in FIG. 15 for example, a unitary geometric shape network forming section 60 for forming a unitary geometric shape network that covers the one image 53 and the other image 54 of the stereo images 46 by duplicating a unitary geometric shape two-dimensionally, wherein the reference area 57 and the search area 58 set by the image search area setting section 56 are of the unitary geometric shape, and the search image distortion correcting section 62 corrects a distortion of the search area 58 with respect to the reference area 57.

Preferably, in the three-dimensional image display apparatus of the present invention as shown in FIG. 15 for example, the reference are a deforming section 72 may be configured to correct the reference area 57 in at least one of set position or shape based on measurement results obtained by the area shape measuring section 80.

Preferably, in the three-dimensional image display apparatus of the present invention as shown in FIG. 4 for example, the unitary geometric shape network forming section 60 may form coarse to fine geometric shapes and may be configured to sequentially form a finer geometric shape from a coarser geometric shape for an image distortion correction.

In order to achieve the above object, a three-dimensional image measuring method of the present invention, implemented on a computer, comprises as shown in FIG. 16 for example, the steps of: forming a unitary geometric shape network (step S206) that covers one image 53 and the other image 54 of a pair of stereo images 46 by duplicating a unitary geometric shape two-dimensionally; setting a reference area 57 in the one image 53 of the pair of stereo images 46 and a search area 58 in the other image of the stereo images 46 in a position corresponding to the reference area 57 (step S208); changing a position of an arbitrary grid point constituting the unitary geometric shape network to deform at least one of the reference areas 57 in at least one of size or shape (step S210); correcting the other image 54 (steps S214, S216) using an image distortion correction amount obtained from positional relationship between the other image 54 and the one image 53 with the set reference area 57 or with the reference area 57 with the deformed size or shape; obtaining positional relationship between the reference area 57 and the search area 58 corresponding to the reference area 57 (step S220), using the one image 53 and the other image corrected with the image distortion correction amount; and measuring a shape of a measuring object (step S226) photographed in the stereo images 46 based on the reference area in the one image 53 on which the unitary geometric shape network is formed and the search area 58 in the other image 54 which has been corrected.

With a three-dimensional image measuring apparatus and method of the present invention, projections and depressions on a surface of an object can be measured with fine precision, as well as stable convergence can be ensured, even for stereo images with significant project distortion. Images with significant projection distortion include central projection images resulting from measurement at relatively short to middle distances, and parallel projection images in which significant ups and downs are captured. Typical examples of the latter include, for example, photographing of semiconductor samples and objects with such projections and depressions that significantly affect the photographing distance.

The basic Japanese Patent Application No. 2004-126090 filed on Apr. 21, 2004 is hereby incorporated in its entirety by reference into the present application.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the present claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "or the like") provided herein, is intended merely to better illuminate the invention and does not pose a limitation on the scope of the invention unless otherwise claimed.

BRIEF DESCRIPTION OF THE DRAWINGS

FIG. 2 illustrates a reference area 57 set in a reference image 53 and a search area 58 set in a search image 54.

FIG. 7 illustrates outlines set in a pair of stereo images.

FIG. 10 illustrates distortion correction for the search image.

DETAILED DESCRIPTION OF THE INVENTION

The present invention is described below with reference to the drawings. A three-dimensional image measuring apparatus of the present invention calculates a three-dimensional shape of a measuring object 41 based on plural, at least two, photographed images, with the two, left and right, images constituting stereo images as one unit. The apparatus also uses 3D data obtained externally or through 3D measurement on the entire measuring object 41, to apply a texture that produces a stereoscopic effect to a two-dimensional image of the measuring object 41. Here, the texture refers to a pattern and an actual image (photograph) of an object given on a surface of a figure, and what is drawn thereon to express its feel, in the graphics and so on.

First Embodiment

Figure 1:
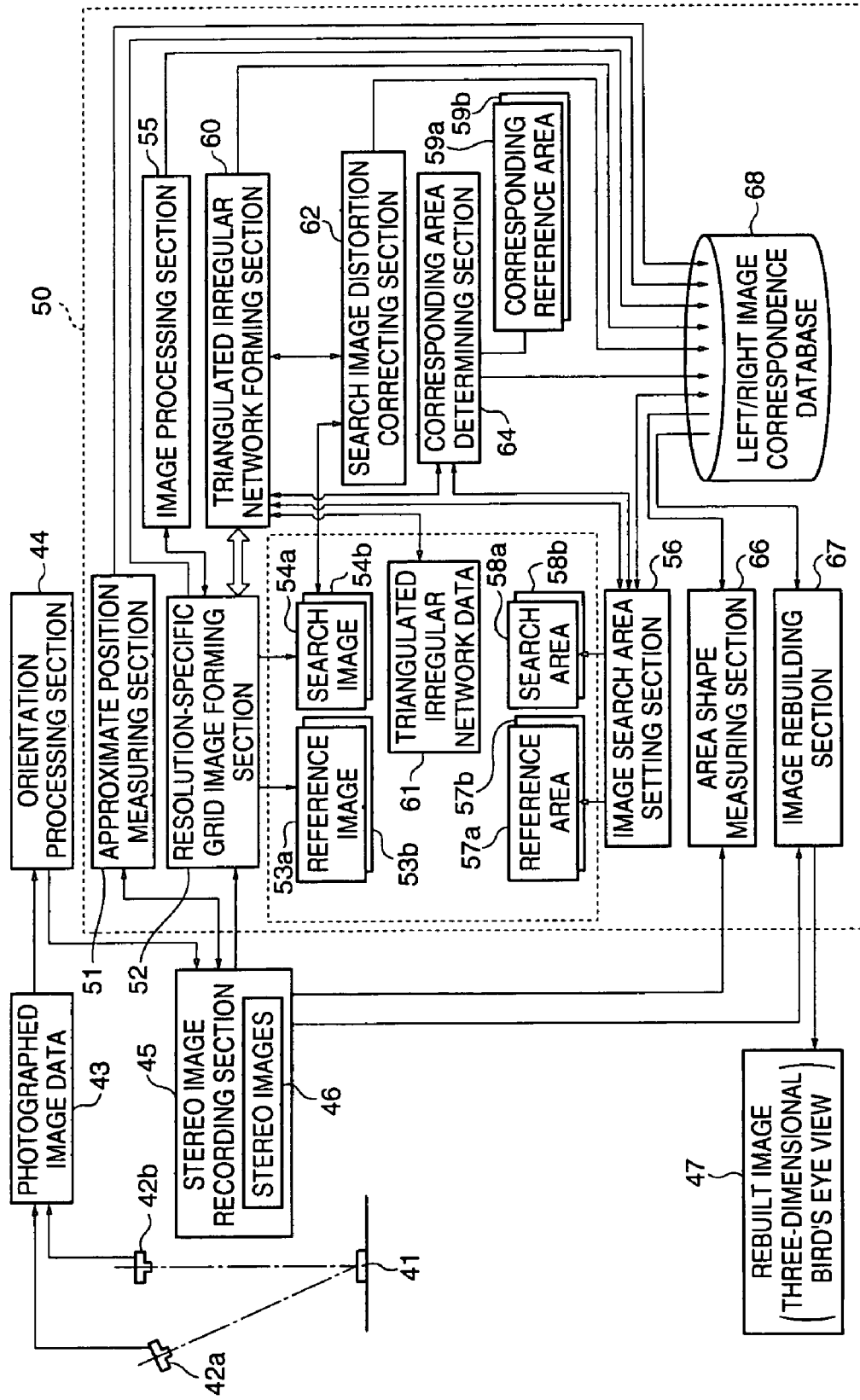
FIG. 1 is a block diagram illustrating the general configuration of a first embodiment of the present invention.

FIG. 1 is a block diagram illustrating the general configuration of a three-dimensional image measuring apparatus of the present invention. In the figure, a measuring object 41 is photographed by cameras 42a, 42b with the same optical properties. The cameras 42a, 42b as an imaging optical system have a known focal length with their lens aberrations compensated, and are disposed such that the object 41 is photographed by the left and right stereo cameras 42a, 42b with the same resolution. The left and right stereo cameras 42a, 42b generate a pair of stereo-photographed image data 43 on the object 41, with a high overlap rate of, for example, not less than 60%. The cameras may be an optical type using general-purpose film, or an electronic type like a CCD (Charged Couple Device). For smooth image processing, the stereo-photographed image data 43 are preferably stored as electromagnetically recorded information in a flexible disk, a CDROM, a DVD or the like.

An orientation processing section 44 performs an interior orientation and an exterior orientation on the stereo-photographed image data 43 photographed by the left and right stereo cameras 42a, 42b, to allow a stereo matching process. The interior orientation refers to a process to perform a correction/calibration on internal geometric structure relating to the cameras and the imaging surface (film) used in the photographing. In the interior orientation, the lens distortion, the positional relationship, such as an eccentricity, between the lens and the film, and the planarity of the film, for example, are corrected. The exterior orientation refers to a process to determine the positions/postures of the cameras at the time of photographing, and is formulated using, for example, a collinearity condition equation. The collinearity condition equation refers to a relational equation formulating the relationship that the projection center, the object and its position on the film are in alignment. A pair of left and right stereo images 46, resulting from the orientation by the orientation processing section 44, are stored in a stereo image recording section 45. The stereo image recording section 45 is a medium for storing image information as electromagnetic information, such as a flexible disk, a CDROM or a DVD, for example. The orientation process may be performed in advance to obtain parameters for the apparatus, or to obtain parameters as the apparatus measures the images. Note that the lens as meant here includes an electron lens for electron microscopes.

An image measuring device 50 includes an approximate position measuring section 51, a resolution-specific grid image forming section 52, an image processing section 55, an image search area setting section 56, a triangulated irregular network forming section 60 as a unitary geometric shape network forming section, a search image distortion correcting section 62, a corresponding area determining section 64, an area shape measuring section 66, an image rebuilding section 67, and a left/right image correspondence database 68. The image measuring device 50 handles data such as a reference image 53, a search image 54, a reference area 57, a search area 58, a corresponding reference area 59, and triangulated irregular network data 61. A computer, such as a personal computer with advanced calculation processing function or a workstation, may be used as the image measuring device 50. The respective components of the image measuring device 50 may be implemented by application software or a highly integrated electronic circuit such as an ASIC. The geometric shape formed by the unitary geometric shape network forming section is not limited to a triangle, but may be a unitary surface of any shape that allows interpolation of the height, such as a square or one defined by line segments.

The approximate position measuring section 51 has functions of extracting marks or characteristic points in the pair of stereo images 46, and finding approximate positions of the marks or the characteristic points in the pair of stereo images by a projective transformation using the extracted marks or characteristic points.

The resolution-specific grid image forming section 52 generates, with respect to the pair of stereo images 46, a reference image 53 and a search image 54, or more specifically, reference images 53a, 53b, ... and search images 54a, 54b, ..., sequentially from high-resolution ones to low-resolution ones. Typically, the reference image 53 is generated with respect to the left one of the pair of stereo images 46, while the search image 54 is generated with respect to the image other than the one with respect to which the reference image is generated, namely the right image. The resolution of an image is a parameter that determines the expressive power or fineness of the image, which is coarse in low-resolution images and fine in high-resolution images. An amount of data included in an image is huge. Therefore, in order to decrease an amount of calculation in stereo matching, approximate positions of the corresponding points are extracted using the low-resolution images, and then more precise positions thereof are sequentially extracted using the higher-resolution images. Typically, such images may be generated in two layers of resolution, namely a low resolution as a first resolution and a high resolution as a second resolution. The layer structure of image resolution involves a Coarse To Fine method, which will be described in detail later. Note that the reference image 53 and the search image 54 generated by the resolution-specific grid image forming section 52 may be generated in three layers or more.

The image processing section 55 sharpens, enhances the contrast of, or enhances the edges in, the pair of stereo images 46 handled by the resolution-specific grid image forming section 52, namely the reference image 53 and the search image 54. The image processing section 55 also performs an interpolation or a compression on image data, which is necessary to prepare images with different resolutions, or extracts characteristics from image data.

The image search area setting section 56 sets a reference area 57 with respect to the reference image 53, and a search area 58 with respect to the search image 54. The reference area 57 is in the shape of a square, for example, and referred to as a template. The search area 58 confines an area of the reference area 57 to be searched, and is preferably smaller than the entire search image 54 but larger than the reference area 57. In cases where the resolution-specific grid image forming section 52 generates the reference image 53 and the search image 54 in two layers of low and high resolutions, the image search area setting section 56 also generates the reference area 57 and the search area 58 in two layers of low and high resolutions. In cases where the resolution-specific grid image forming section 52 generates the reference image 53 and the search image 54 in three layers of resolution, the image search area setting section 56 also generates the reference area 57 and the search area 58 in three layers of resolution.

FIG. 2 illustrates the reference area 57 set in the reference image 53 and the search area 58 set in the search image 54. The image search area setting section 56 secures the search area 58 set in the search image 54 to be wider compared to the reference area 57 set in the reference image 53. This increases the probability of existence within the search area 58 of a region that shows a high correlation coefficient with respect to the reference area 57. Note that the reference area 57 and the search area 58 can be defined to contain all the pixels constituting the respective images. In such cases, where the reference area 57 and the search area 58 are defined to contain all the pixels, even when the image information includes no distinct patterns, as with a semiconductor wafer before patterning, distinction of positions is made possible at some locations based on overall patterns of color tone or brightness. However, the reference area 57 and the search area 58 may be set only for image information including light and shade or a shape/outline of such a degree as to allow distinction of positional relationship, such as regular intervals and corresponding points/characteristic points.

Returning to FIG. 1, the triangulated irregular network forming section 60 forms a Triangulated Irregular Network (TIN) that covers the reference image 53 and the search image 54 with irregular triangles. Irregular triangles as a unitary geometric shape preferably use equivalent locations in the reference image 53 and the search image 54 as their vertexes. The irregularity of the triangles is attributable to the projections and depressions on the object 41 surface photographed in the pair of stereo images 46, or the difference in visual axis between the cameras 42a, 42b. That is, although a considerably symmetric figure such as an equilateral triangle or an isosceles triangle is typically used as the unitary geometric shape, irregularity is caused by distortion due to the nature of the pair of stereo images 46. The triangulated irregular network does not necessarily cover the entire reference image 53 and search image 54, but may cover only a region as an object of the three-dimensional image measurement. The triangulated irregular network will be described in detail later.

The search image distortion correcting section 62 applies an image distortion correction to the search image 54 according to the positional relationship between the reference area 57 and the search area 58 corresponding to the reference area 57. The search image distortion correcting section 62 performs a corresponding point detection between the reference area 57 and the search area 58 as follows. In the corresponding point detection, pass points and reference points used in photogrammetry, for example, are provided in the reference image 53 and the search image 54. In order to match the left and right images of the pair of stereo images 46, a window of the same size as the template, or the reference area 57, is moved with respect to the search image 54 set by the image search area setting section 56, and the search image distortion correcting section 62 performs a function of corresponding point detection to detect a position where density values are most similar between the reference area 57 and the search area 58.

In the corresponding point detection, the work efficiency of the measurement of image coordinates on the pass points and the reference points can be improved by the additional use of stereo matching. For example, the corresponding point detection with a matching method using a normalized correlation coefficient or a Least-Squares Matching (LSM) allows high-precision automatic measurement of orientation points such as pass points and reference points.

Then, the search image distortion correcting section 62 performs the matching method using a normalized correlation coefficient, for example. With reference to FIG. 2, the process of the matching method is described. In FIG. 2, the right image corresponds to the reference image 53, and the left image corresponds to the search image 54. The reference area 57 is constituted of N pieces of data, and the search area 58 has an image coordinate (U, V) as its starting point. In the matching method using a normalized correlation coefficient, the reference area 57 is moved in the search area 58 from left to right, and on reaching the right end of the search area 58, returned to the left end of the row below and again moved from left to right. In respective positions of the reference area 57 during this raster scanning, a calculation formulated by the equation 1 is performed.

$$M=M(Xi, Yi)(1 \leq i \leq N) \quad (1)$$

$$I=I(U+Xi, V+Yi)$$

where M represents a normalized value for the reference area 57, and I represents a normalized value for the search area 58.

Then, the similarity between the reference area 57 and the search area 58 is given by a normalized correlation coefficient R(U, V) as follows.

$$R(U,V)=(N\Sigma IiMi-\Sigma Ii\Sigma Mi)/\text{SQRT}[\{N\Sigma Ii^2-(\Sigma Ii)^2\}\{N\Sigma Mi^2-(\Sigma Mi)^2\}] \quad (2)$$

Here, the normalized correlation coefficient R always takes a value from −1 to 1. When the normalized correlation coefficient R is 1, the reference area 57 as a template and the corresponding image in the search area 58 completely coincide with each other. Thus, it is possible to find in the search area 58 a corresponding reference area 59 where the image is most similar to the reference area 57, by finding a position where the correlation coefficient value is maximum by the corresponding area determining section 64.

In cases where the search area 58 includes no point where the image is similar to the reference area 57, the maximum value of the normalized correlation coefficient R is small (0.1, for example) and therefore the search for the corresponding reference area 59 should be determined to have failed. However, in the search, the corresponding area determining section 64 uses, as the coordinate value for the corresponding reference area 59, the value for a coordinate where the value of the normalized correlation coefficient R is maximum. Under such a condition, even a coordinate value for the low normalized correlation coefficient, which in some cases is as low as to satisfy R=0.1 and almost equivalent to that of noise, can be used as the coordinate value for the corresponding reference area 59. Thus, in cases where the maximum value of the normalized correlation coefficient R is so small and not more than a preset threshold (0.2-0.3, for example), the search for the corresponding reference area 59 is determined to have failed.

Figure 3:
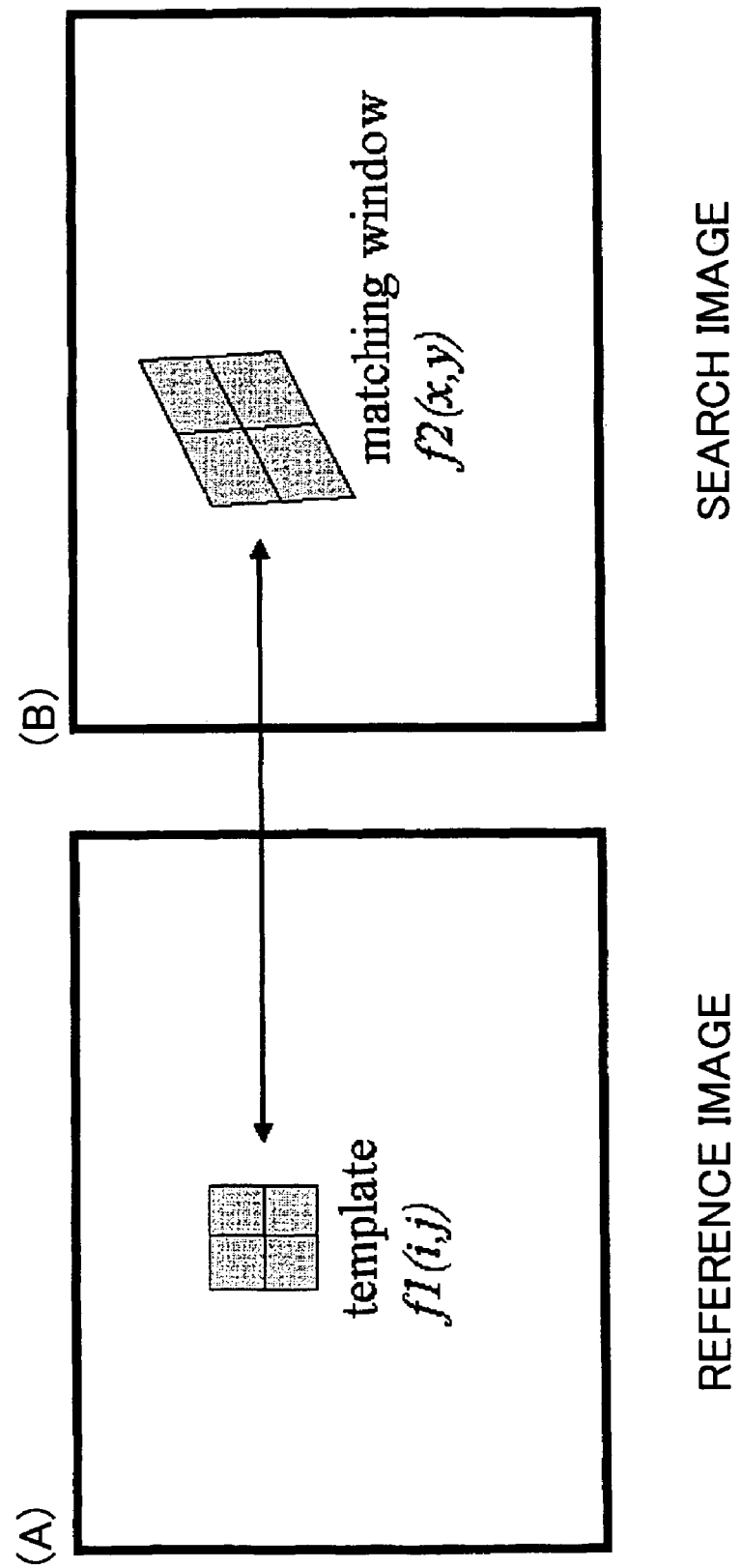
FIG. 3 illustrates corresponding point detection using least-squares matching.

Now, the corresponding point detection using the least-squares matching is described. FIG. 3 illustrates the corresponding point detection using the least-squares matching, in which FIG. 3(A) shows a window corresponding to the reference area 57 in the reference image 53 and FIG. 3(B) shows a window corresponding to the search area 58 in the search image 54 after an affine deformation. In the figure, the search image distortion correcting section 62 performs a matching calculation of a window in the search image 54 with that corresponding to the reference area 57 in the reference image 53 while performing the affine deformation on the former, to measure the corresponding points by the sub-pixel.

First of all, defining a template within the search image 54 corresponding to the reference area 57 before the affine deformation as f1(i, j) and a matching window corresponding to the search area 58 after the affine deformation as f2(x, y), deformation of the matching window is approximated by the affine deformation formulated by the equation (3).

$$\left. \begin{array}{l} x = a_1 i + a_2 j + a_3 \\ y = a_4 i + a_5 j + a_6 \end{array} \right\} \quad (3)$$

Between the pixel f1(i, j) in the template before the affine deformation and the pixel f2(x, y) in the matching window after the affine deformation, the density difference d(i, j) at the pixel under comparison (i, j) is given by the following equation (4).

$$\begin{aligned} d(i, j) &= f_1(i, j) - f_2(x, y) \\ &= f_1(i, j) - f_2(a_1 i + a_2 j + a_3, a_4 i + a_5 j + a_6) \end{aligned} \quad (4)$$

Next, such coefficients a1-a6 are determined that make the sum of the squares of the density difference minimum, which in other words satisfy the following equation.

$$\Sigma d(i,j)^2 \rightarrow \min \quad (5)$$

where the coefficients a1, a2, a4, a5 represent deformation of the matching window, and the coefficients a3, a6 are corresponding to the coordinate of the position to be detected.

The search image distortion correcting section 62 may alternatively use a least-squares matching using an epipolar constraint. That is, in cases where the reference image 53 and the search image 54 are rectified images and the search image distortion correcting section 62 performs a stereo matching between the rectified images, one-dimensional search is performed along an epipolar line to achieve the matching and therefore the speed and reliability of the matching can be improved. While the least-squares matching uses the affine transformation equation (3) representing deformation of the matching window, a simplified form such as the equation (6) can be used here by the effect of epipolar constraint conditions.

$$x = a_1 i + a_2 j + a_3$$

$$y = j \quad (6)$$

The corresponding area determining section 64 searches in the search image 54 for a search area 58 corresponding to the reference area 57 provided in the reference image 53 using, for example, the above-mentioned affine transformation. The corresponding area determining section 64 handles image data and thus searches, in the reference image 53 and the search image 54 of the same resolution, for a search area 58 which is the same as, or has similarity to, the reference area 57. In other words, the corresponding area determining section 64 does not search in, and detect correspondence between, the reference image 53 and the search image 54 of different resolutions.

The area shape measuring section 66 uses the obtained positional relationship to measure the object photographed in the pair of stereo images. The area shape measuring section 66 of the present embodiment combines the coarse to fine method and the triangulated irregular network method, as well as systematically combines the least-squares method and the normalized correlation method, to perform a measurement on the object by the sub-pixel, which is more precise than the pixels in the stereo images 46, with a small amount of calculation.

The image rebuilding section 67 rebuilds a two-dimensional or three-dimensional image of the object based on the results of the measurement, obtained by the image measuring device 50, on the object photographed in the pair of stereo images 46. A rebuilt image 47 includes various images such as a three-dimensional bird's-eye view and an orthographic view. The left/right image correspondence database 68 stores information on the corresponding points between the left and right images photographed in the pair of stereo images 46, and is commonly used by the approximate position measuring section 51, the resolution-specific grid image forming section 52, the image processing section 55, the image search area setting section 56, the corresponding area determining section 64, the area shape measuring section 66, and the image rebuilding section 67. Note that the 3D modeling of the object requires the concept of a surface and therefore the DSM (Digital Surface Model) data obtained from the measurement in the stereo matching should be processed, not as a group of points, but as a TIN (Triangulated Irregular Network) model in a surface manner. Polyline data obtained by manual measurement, such as an outline, may also be used as a TIN model.

Next, with reference to the drawings, the operations of the respective components are described in further detail. Note that the descriptions here are only for illustration and not for limitation. For example, the degree of coarseness/fineness or the number of layers may be set arbitrarily. Also, the density of the TIN (Triangulated Irregular Network) model may be changed/set arbitrarily.

Figure 4:
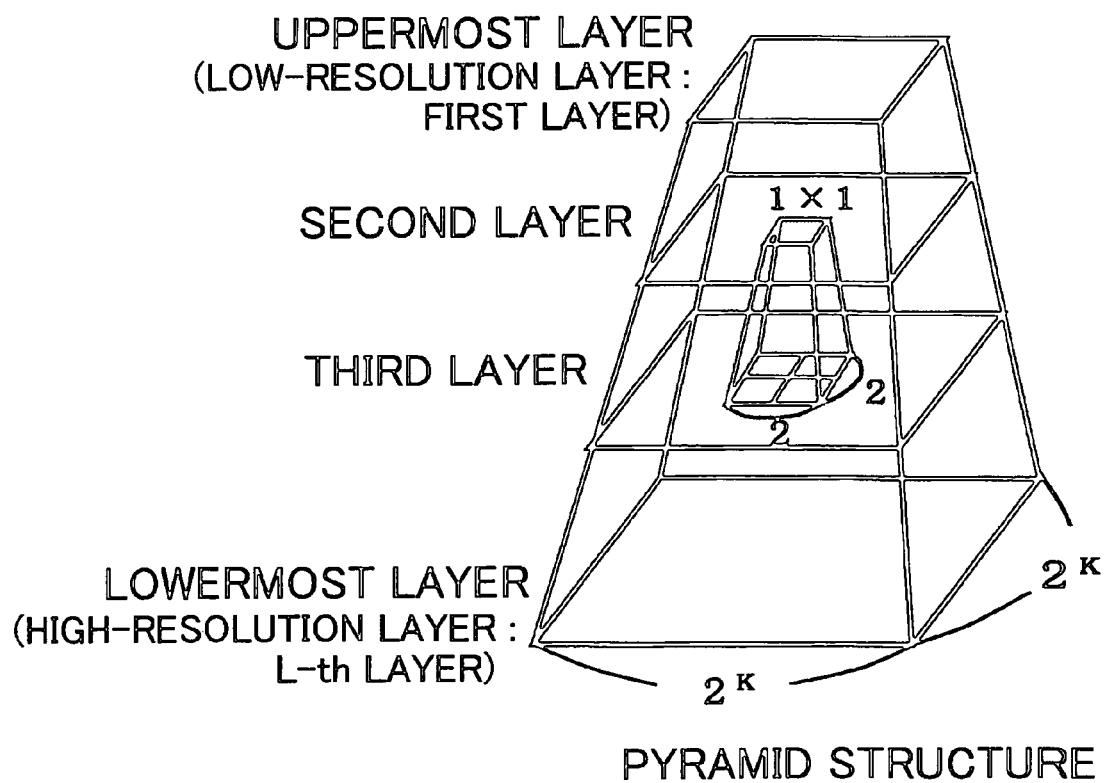
FIG. 4 is a diagram illustrating the layer structure used in a coarse to fine method.

FIG. 4 is a diagram illustrating the layer structure used in the coarse to fine method. In order to optimize the period for the calculation of image correlation by the corresponding area determining section 64, the resolution-specific grid image forming section 52 generates the pair of stereo images 46 in multiple layers of different resolutions. On this occasion, multiple layers of a pyramid structure are used in the search to securely detect corresponding points by the image correlation calculation. With the pyramid structure, an approximate superposition is performed in the uppermost layer of a coarse resolution, and thereafter a precise superposition is performed in a layer of a finer resolution. This allows integrated determination of the matching results between images at respective resolutions, in addition to reduction of the period for the calculation of image correlation, thereby reducing miscorrelation. As shown in FIG. 4, in the multiple layers of the pyramid structure, images of different image resolutions are prepared in advance, as follows: a low-resolution layer (a first reference image), a second layer (a second reference image), . . . , a high-resolution layer (an L-th reference image), a low-resolution layer (a first search image), a second layer (a second search image), . . . , a high-resolution layer (an L-th search image). Preferably, the pixel density for the high-resolution layer is equivalent to that of the reference image 53 and the search image 54, for example, while the pixel resolutions for the lower layers become half (i.e., double, in terms of the resolution reduction factor), sequentially layer by layer.

Specifically, the foregoing pyramid structure of reference images and search images is constructed to have a first layer to an L-th layer (where the lowermost layer is defined as an L'-th layer), by applying the equation (7) with the image processing section 55 and the resolution-specific grid image forming section 52. Here, the L-th layer is represented as follows.

$$f_{L-1}(x, y) = \sum_{i=0}^{1} \sum_{j=0}^{1} f_L(2x+i, 2y+j) \qquad (7)$$

where x, y=0, 1, . . . , $2^{K-(L'-L)-1}$. When L=3 holds true, the total number of layers is three. With a view to add a third layer to the existing two layers, a layer of a resolution higher than the second resolution (a third resolution) may be provided as the third layer, or a layer of a resolution between the first resolution and the second resolution (a fourth resolution) may be provided as the third layer.

Figure 5:
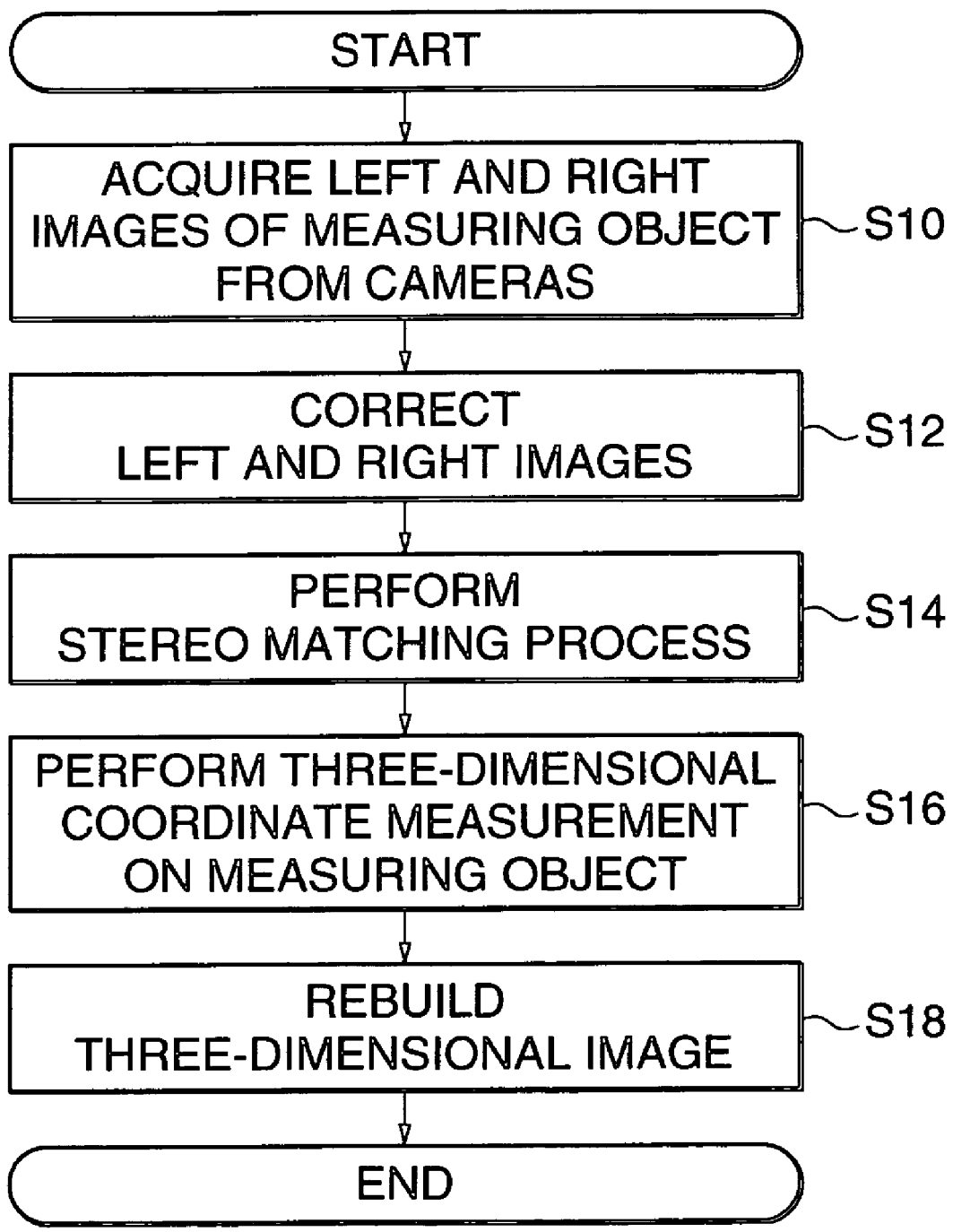
FIG. 5 is a flowchart for explaining the entire process of three-dimensional image measurement on a pair of stereo images.

Now, the operation of an apparatus constituted as described above will be described. FIG. 5 is a flowchart for explaining the entire process of three-dimensional image measurement on a pair of stereo images. First of all, the left and right stereo cameras 42a, 42b are used to acquire left and right images of the object 41 from the cameras (step S10). The left and right images from the cameras are corrected by the orientation processing section 44, and preferably made free of vertical parallax at the same time, as stereo-photographed image data 43 (step S12). The resulting stereo images are stored in the stereo image recording section 45 as a pair of stereo images 46. A stereo matching process is performed on the pair of stereo images 46 (step S14). Using the pair of stereo images 46 on which the stereo matching has been performed, a three-dimensional coordinate measurement is performed on the object 41 photographed in the stereo images 46 (step S16). A three-dimensional image of the object 41 is rebuilt in an appropriate form (step S18).

Figure 6A:
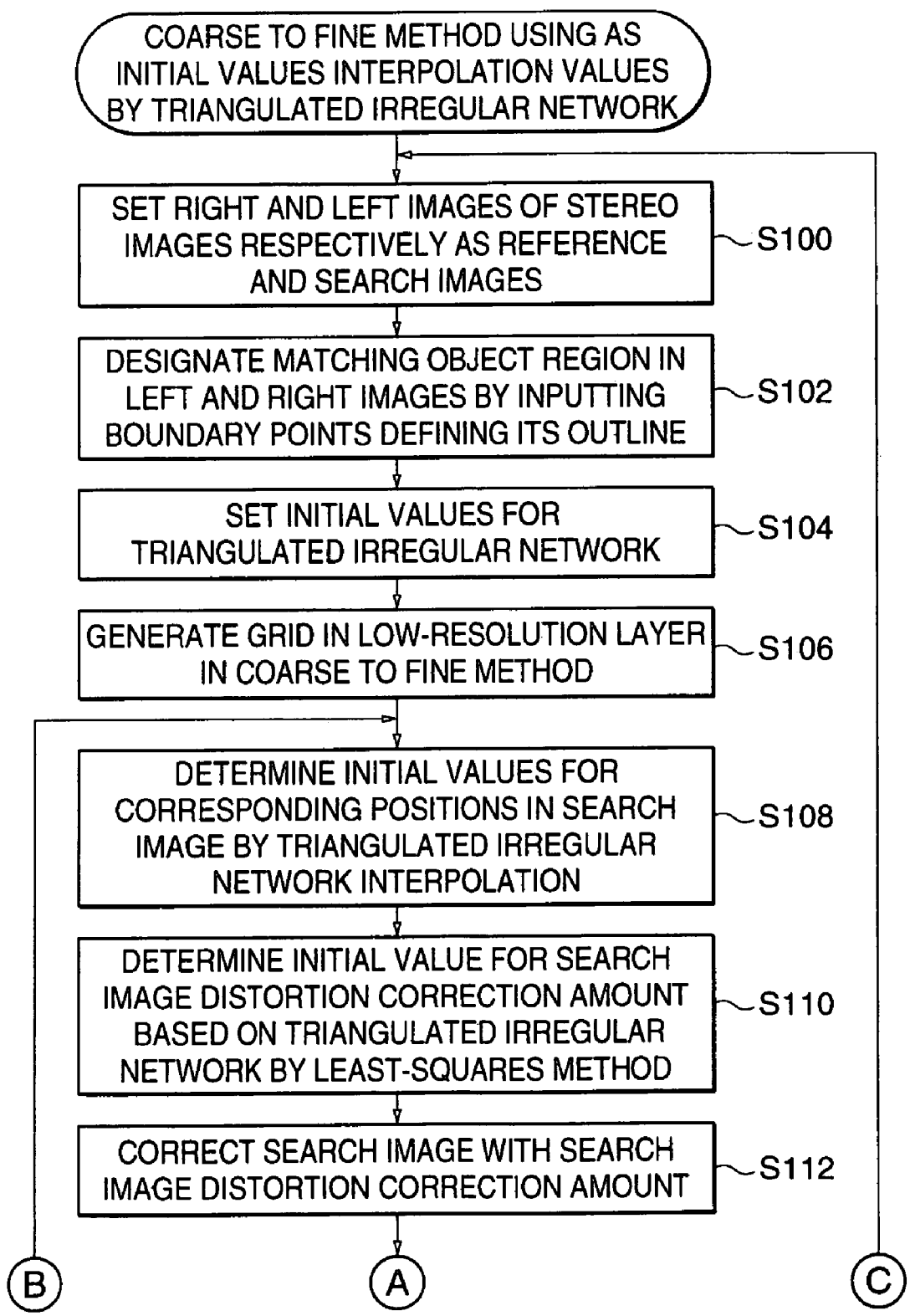
FIG. 6A and FIG. 6B are flowcharts for explaining an embodiment of the present invention.
Figure 6B:
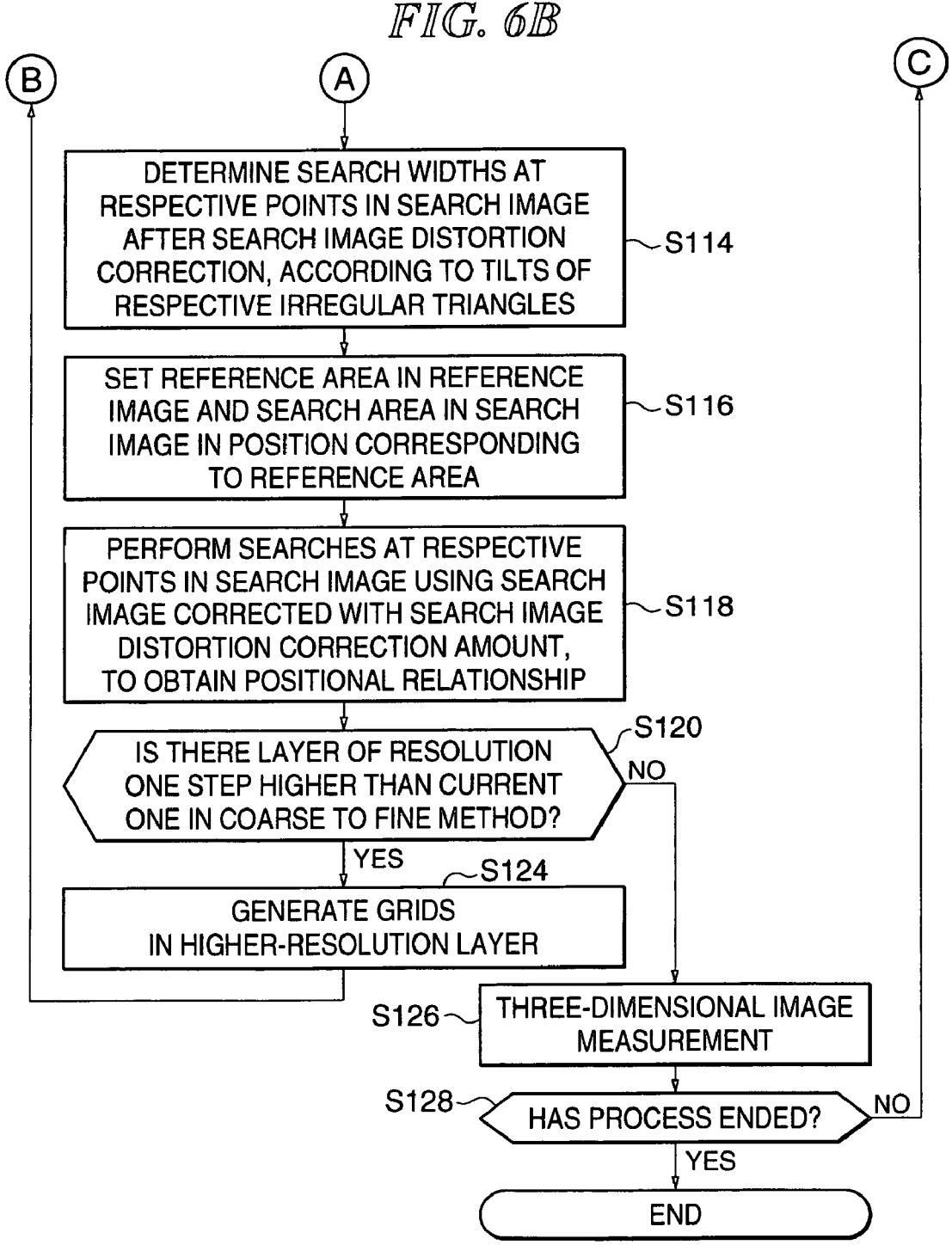

Using FIG. 6, a description is made of the operation of the image measuring device of FIG. 1. FIG. 6 is a flowchart for explaining an embodiment of the present invention, explaining the combined operation of the coarse to fine method, the triangulated irregular network and the least-squares method. The image measuring device 50 captures a pair of stereo images 46 from the stereo image recording section 45, and the resolution-specific grid image forming section 52 sets a reference image 53 and a search image 54 with respect to the left and right images of the pair of stereo images 46 (step S100). A matching object region in the left and right images is designated by inputting boundary points defining its outline, for example by an operator (step S102). FIG. 7 illustrates the outlines set in the pair of stereo images 46, in which FIG. 7(A) shows the left image (search image 54) and FIG. 7(B) the right image (reference image 53). When the operator designates a matching object region by inputting boundary points defining its outline in one of the pair of stereo images 46, the image search area setting section 56 performs its input assist function to automatically set corresponding boundary points defining an outline in the other.

Figure 8:
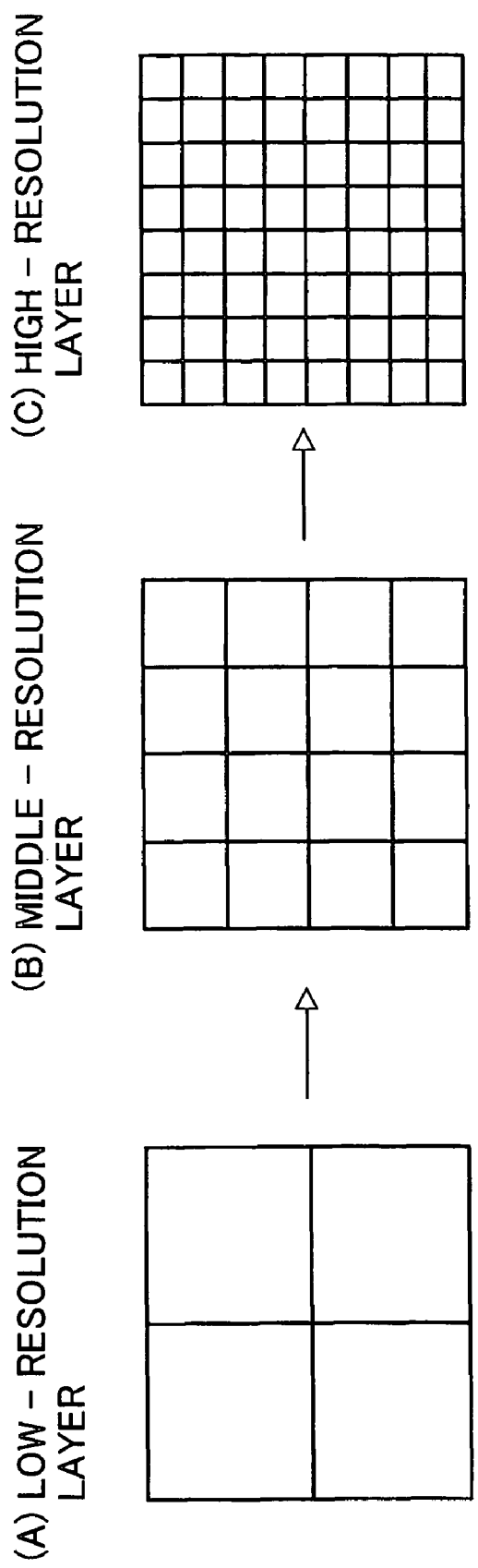
FIG. 8 illustrates grids generated by a resolution-specific grid image forming section.

Initial values for the triangulated irregular network are set, by the operator or an initial value setting function of the image measuring device 50 (step S104). The triangulated irregular network forming section 60 duplicates an irregular triangle two-dimensionally to form a triangulated irregular network that covers the reference image 53 and the search image 54 of the stereo images 46. The resolution-specific grid image forming section 52 generates a grid in the low-resolution layer in the coarse to fine method (step S106). FIG. 8 illustrates the grids generated by the resolution-specific grid image forming section 52, in which FIG. 8(A) shows one in a low-resolution layer, FIG. 8(B) one in a middle-resolution layer and FIG. 8(C) one in a high-resolution layer. As described above, single grids in a lower-resolution layer are respectively divided into plural grids in a higher-resolution layer, so that the positional information obtained in the lower-resolution layer can be effectively used in the higher-resolution layer.

Figure 9:
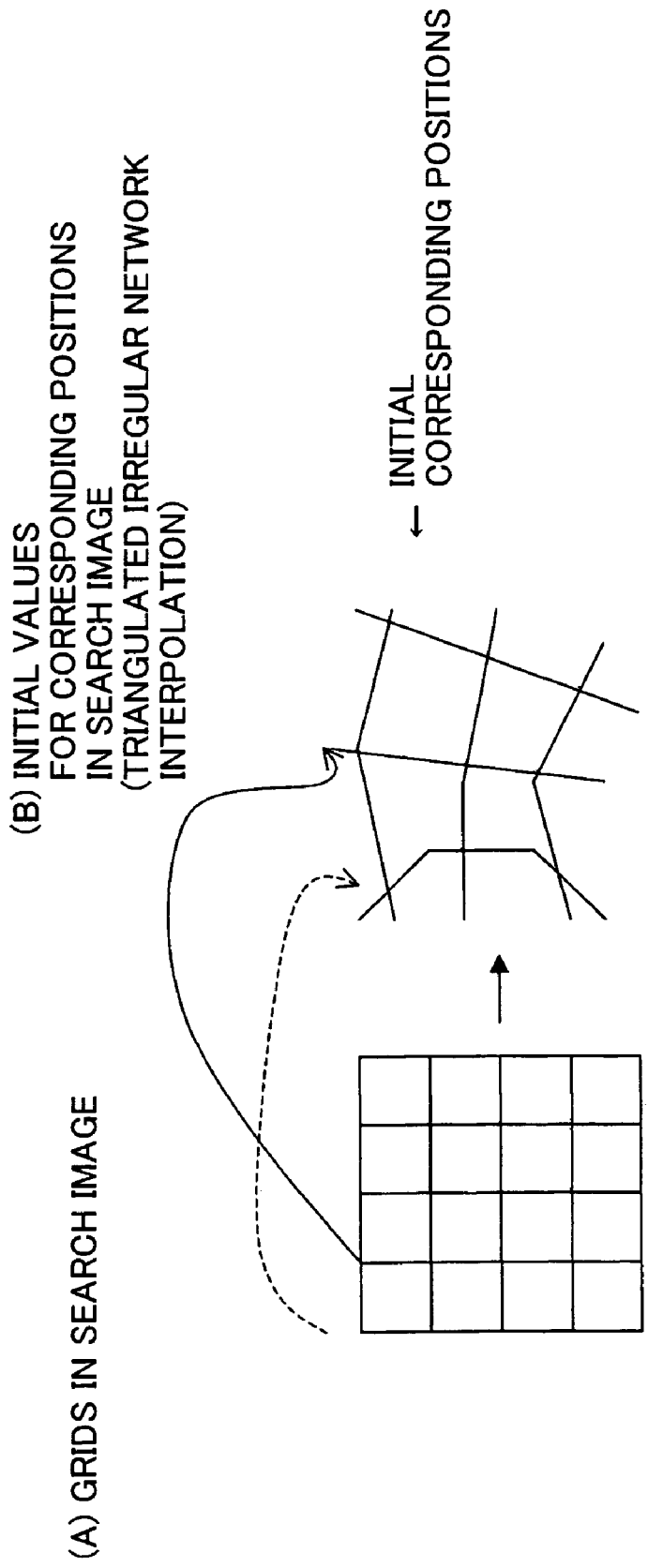
FIG. 9 illustrates search width correction at respective points in the search image after triangulated irregular network interpolation.

Initial values for corresponding positions of the search image 54 to the reference image 53 are obtained by triangulated irregular network interpolation (step S108). Here, the triangulated irregular network interpolation refers to a process to form a digital elevation model (DEM) made up of a group of triangles generated from topographic points disposed in a random manner so as to obtain positions of arbitrary points by interpolation using values for known points. FIG. 9 illustrates search width correction at respective points in the search image 54 after the triangulated irregular network interpolation, in which FIG. 9(A) illustrates the grids in the search image 54 in an initial state and FIG. 9(B) the grids deformed according to the initial values for the corresponding positions in the search image 54 obtained by the triangulated irregular network interpolation. The grids in the search image 54 in the initial state are deformed, according to the initial values for the corresponding positions in the search image 54 obtained by the triangulated irregular network interpolation, into a state such as shown in FIG. 9(B).

The corresponding area determining section 64 determines an initial value for an amount of distortion correction for the search image based on the triangulated irregular network by the least-squares method (step S110). FIG. 10 illustrates the distortion correction for the search image 54, in which FIG. 10(A) illustrates a state before the distortion correction for the search image and FIG. 10(B) a state after the distortion correction for the search image. The initial value for the distortion correction amount for the search image is obtained based on the coefficients a1-a6 in the affine deformation equation in the corresponding point detection using the least-squares matching. The transformation coefficients in the corresponding point detection using the least-squares matching obtained with respect to the search image 54 in a current resolution layer can be used as initial values in matching in a higher-resolution layer, and eventually contribute to the determination of optimum positions of the corresponding points in images of the original resolution.

Figure 11:
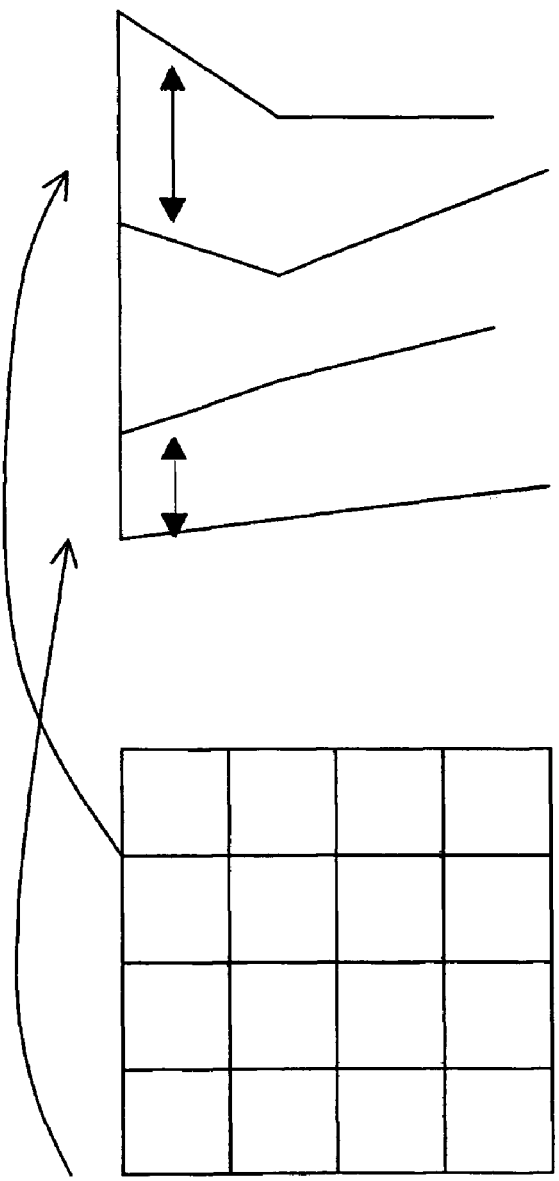
FIG. 11 illustrates search width correction at respective points in the search image 54 after tilt distortion correction.

The search image distortion correcting section 62 corrects the search image 54 with the search image distortion correction amount obtained in step S110 (step S112). The search image distortion correcting section 62 determines search widths at respective points in the search image 54 after the search image distortion correction, according to the tilts of the respective irregular triangles (step S114). FIG. 11 illustrates the search width correction at respective points in the search image 54 after the tilt distortion correction, in which FIG. 11(A) illustrates the grids in the search image 54 and FIG. 11(B) the grids in the search image 54 deformed according to the tilts of the irregular triangles. The search widths for the grids in the search image 54 are corrected according to the tilts of the irregular triangles including respective pixels. In other words, the search image distortion correcting section 62 corrects the positional relationship between the reference image 53 and the search image 54 of the stereo images 46, or specifically corrects the search image 54 in consideration of the entire images, according to the amount of deformation obtained from the triangulated irregular network, and corrects the search image 54 locally at individual pixels according to the tilts of the irregular triangles including the respective pixels.

The image search area setting section 56 sets a reference area 57 in the reference image 53 of the pair of stereo images 46, and sets a search area 58 in the search image 54 of the stereo images 46 in a position corresponding to the reference area 57 (step S116). The search image distortion correcting section 62 performs searches for the search area 58 at respective points in the search image, using the search image corrected with the search image distortion correction amount (step S118). This allows the positional relationship between the reference area 57 and the search area 58 corresponding to the reference area 57 to be obtained using the reference image 53 and the search image 54 corrected with the image distortion correction amount. The image measuring device 50 determines whether or not there exists a layer of a resolution one step higher than the current one in the coarse to fine method (step S120), and if there does, the resolution-specific grid image forming section 52 generates grids in the layer of the higher resolution (step S124), and the process returns to step S108. The above processes (steps S108-S124) are repeated until the image distortion of the search image 54 is corrected well. The state of being "corrected well" is achieved by appropriately setting the range of resolution, for example.

If the triangulated irregular network is formed up to the layer of the highest resolution, the process branches from step S120 to step S126. The area shape measuring section 66 performs a three-dimensional image measurement at respective points, using the reference image 53 and the search image 54 in which triangulated irregular networks are formed up to the highest-resolution layer and image distortion is corrected (step S126), raising expectations for more precise measurement results. It is determined whether or not the process ends (step S128). When No, the process returns to step S100, and when Yes, the process ends.

Figure 12:
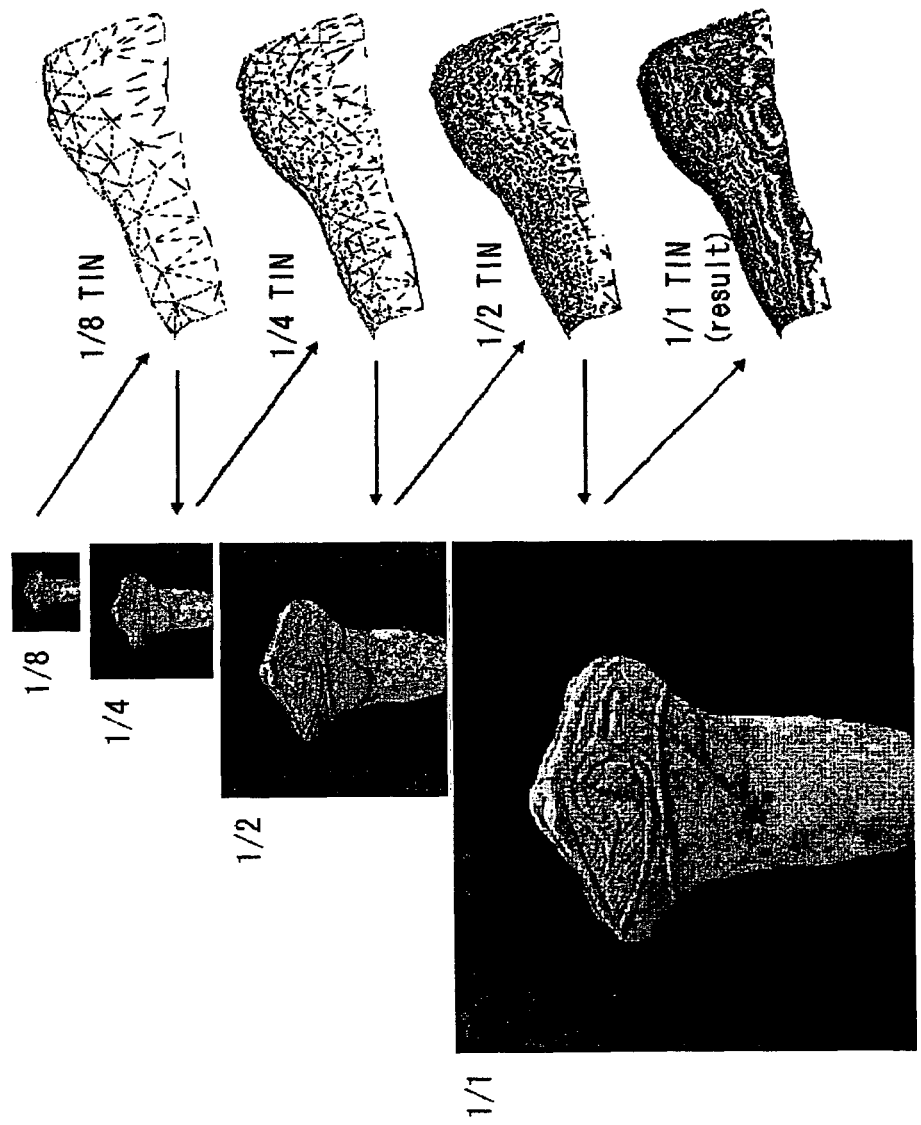
FIG. 12 shows an example of the coarse to fine process and triangulated irregular networks in stereo matching, taking an earthenware as a sample.

FIG. 12 shows an example of the coarse to fine process and triangulated irregular networks in the stereo matching, taking an earthenware as a sample. In the coarse to fine method shown here, the layer structure has four layers of image resolutions. A small image is shown in a low-resolution layer because of a reduced number of pixels, while a large image is shown in a high-resolution layer because of a large number of pixels. With respect to the earthenware as an object, a coarse triangulated irregular network model is initially formed corresponding to the low resolution, and gradually detailed ones are formed as the process proceeds through layers of sequentially higher resolutions.

Figure 13:
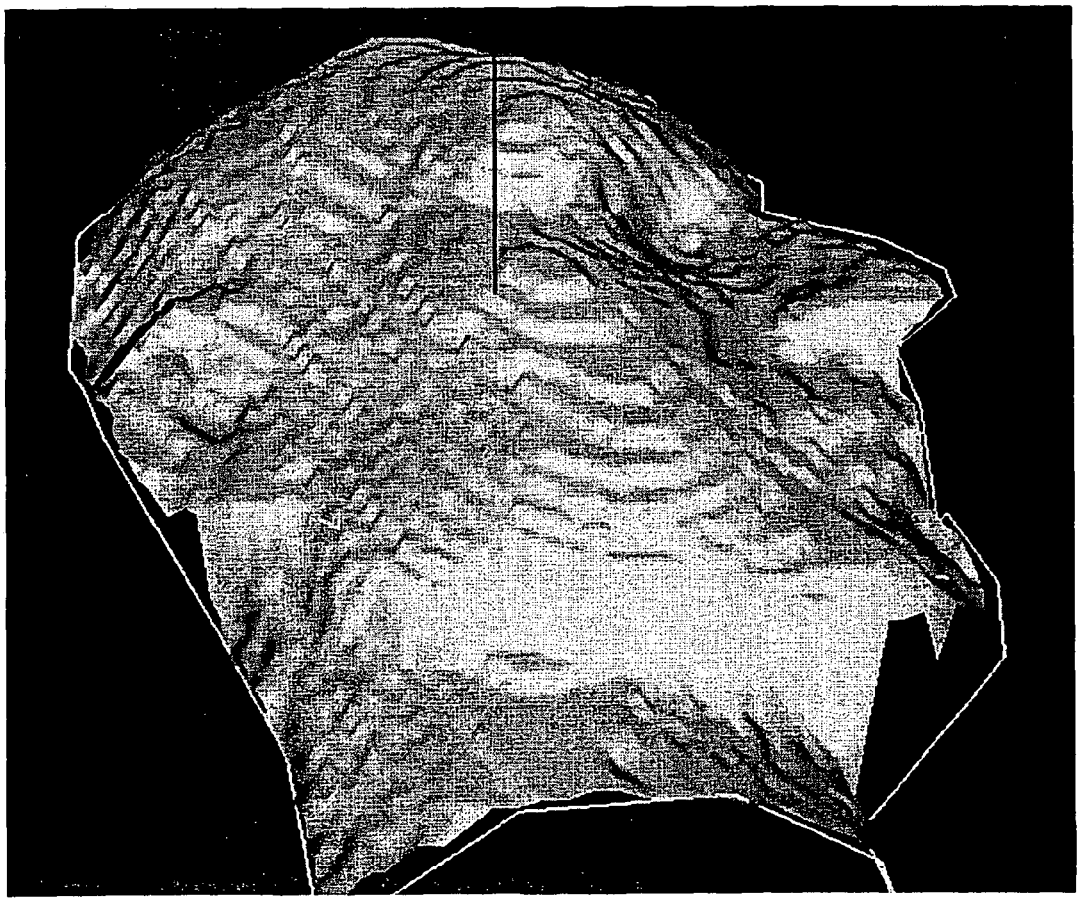
FIG. 13 shows an example of matching results with one-pixel accuracy obtained using regular normalized correlation.
Figure 14:
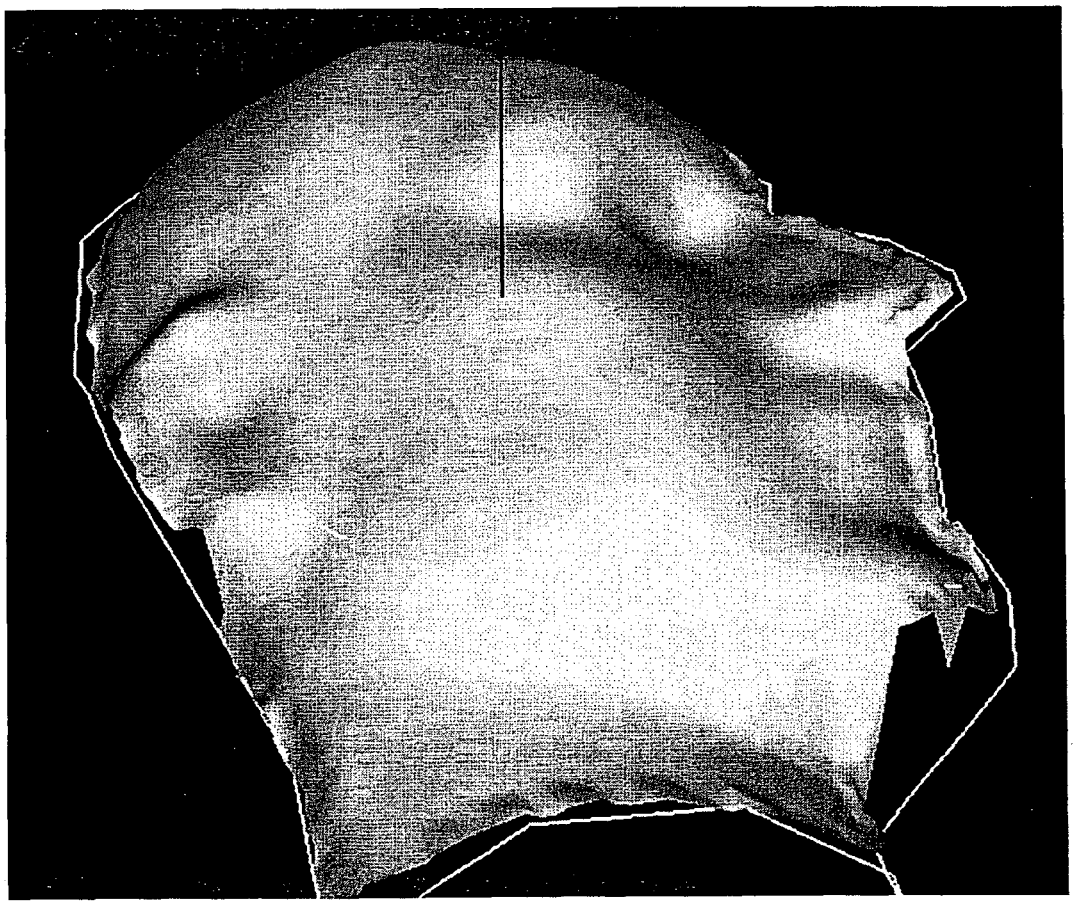
FIG. 14 shows an example of matching results with sub-pixel accuracy obtained using the least-squares matching.

FIG. 13 shows an example of matching results with one-pixel accuracy obtained using regular normalized correlation. FIG. 14 shows an example of matching results with sub-pixel accuracy obtained using the least-squares matching. In cases of a surface with slight projections and depressions of about several mm, such as a facial surface of a mannequin, where the resolution of one pixel corresponds to about several mm, the influence of absence of sub-pixel bits is so significant that the shape of a rebuilt surface involves differences in level. In contrast, the sub-pixel accuracy obtained using the least-squares matching can achieve reproduction with an accuracy of up to about one-tenth to one-hundredth the resolution of one pixel and thus can rebuild a smooth surface.

In the first embodiment, the search image distortion correcting section 62 applies an image distortion correction to the other image 54 according to the positional relationship between the reference area 57 and the search area 58 corresponding to the reference area 57. However, in an alternative embodiment, an image distortion correction may be applied to the reference image 53, instead of the search image 54.

Second Embodiment

Figure 15:
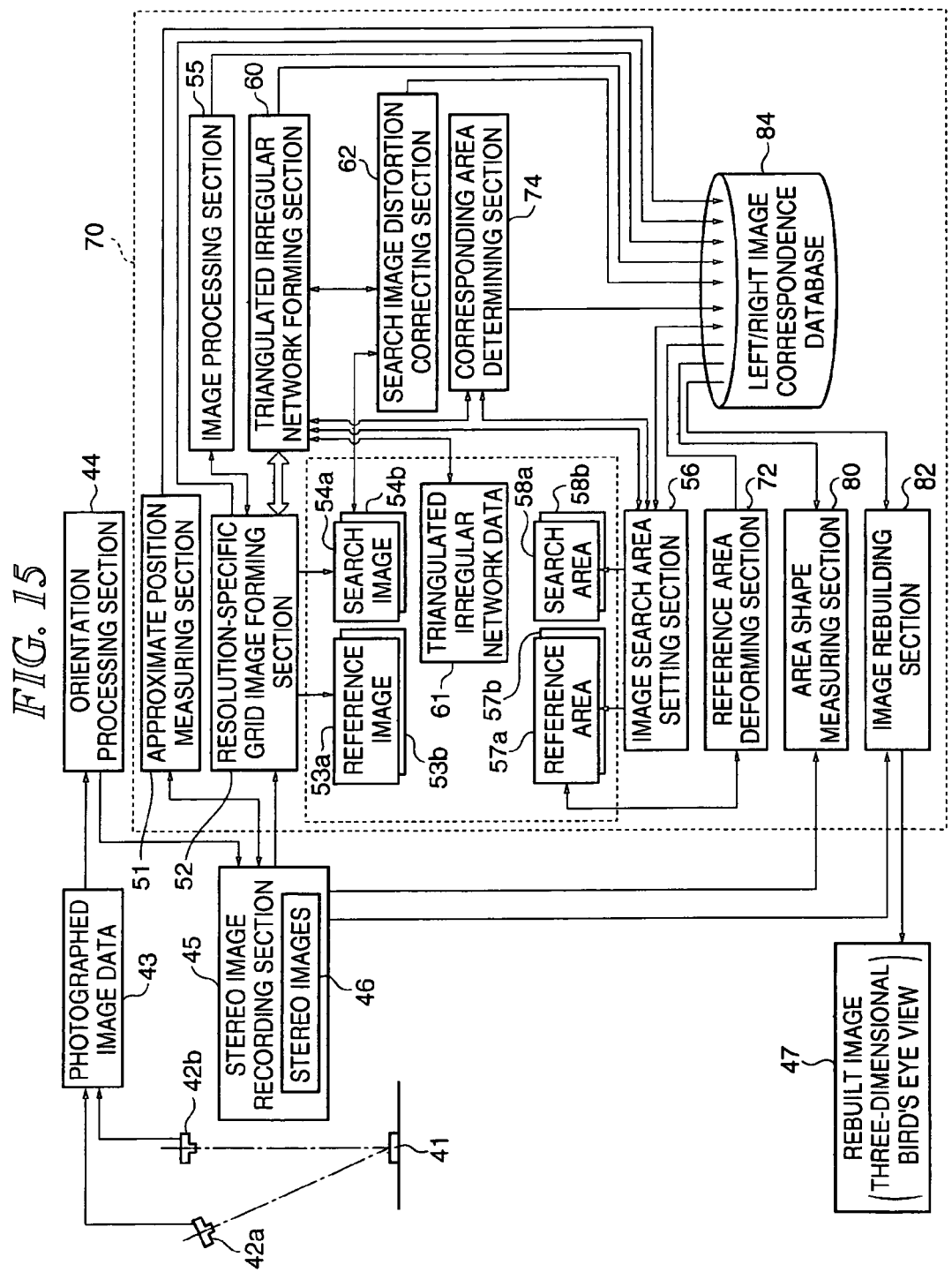
FIG. 15 is a block diagram illustrating the general configuration of a second embodiment of the three-dimensional image measuring apparatus of the present invention.

FIG. 15 is a block diagram illustrating the general configuration of a second embodiment of the three-dimensional image measuring apparatus of the present invention. In the first embodiment, the search image distortion correcting section 62 corrects the search image 54 with the search image distortion correction amount, with the image distortion of the reference image 53 left untouched. However, in cases where the image distortion of the reference image 53 is significant, it may be preferable that the image distortion of the reference image 53 is also corrected in consideration of that of the search image 54. Thus, the second embodiment addresses a case where the image distortion of the reference image 53 is also corrected.

In the figure, components having the same functions as those in FIG. 1 are given the same reference numerals and symbols, and descriptions of such components will not be repeated. An image measuring device 70 includes a reference area deforming section 72, a corresponding area determining section 74, an area shape measuring section 80, an image rebuilding section 82, and a left/right image correspondence database 84. The reference area deforming section 72 deforms the reference area 57 in at least one of size or shape, and for example, an operator views an image of the search area 58 corresponding to the reference area 57 to determine appropriately or utilizes the orientation results. Preferably, the reference area deforming section 72 corrects the reference area 57 in at least one of set position or shape based on the measurement results obtained by the area shape measuring section 80 such that the image distortion of the reference image 53 is reduced.

The corresponding area determining section 74 determines a search area 58 corresponding to the reference area 57, either set by the area setting section 56 or deformed by the reference area deforming section 72, by the correlation process described already. The search image distortion correcting section 62 applies a predetermined image distortion correction to the search image 54 according to the positional relationship between the reference area 57 and the search area 58 corresponding to the reference area 57. The area shape measuring section 80 measures a shape of a measuring object 41 photographed in the stereo images 46 based on the reference area 57 in the reference image 53 and the search area 58 in the search image 54 corrected by the search image distortion correcting section 62.

Figure 16A:
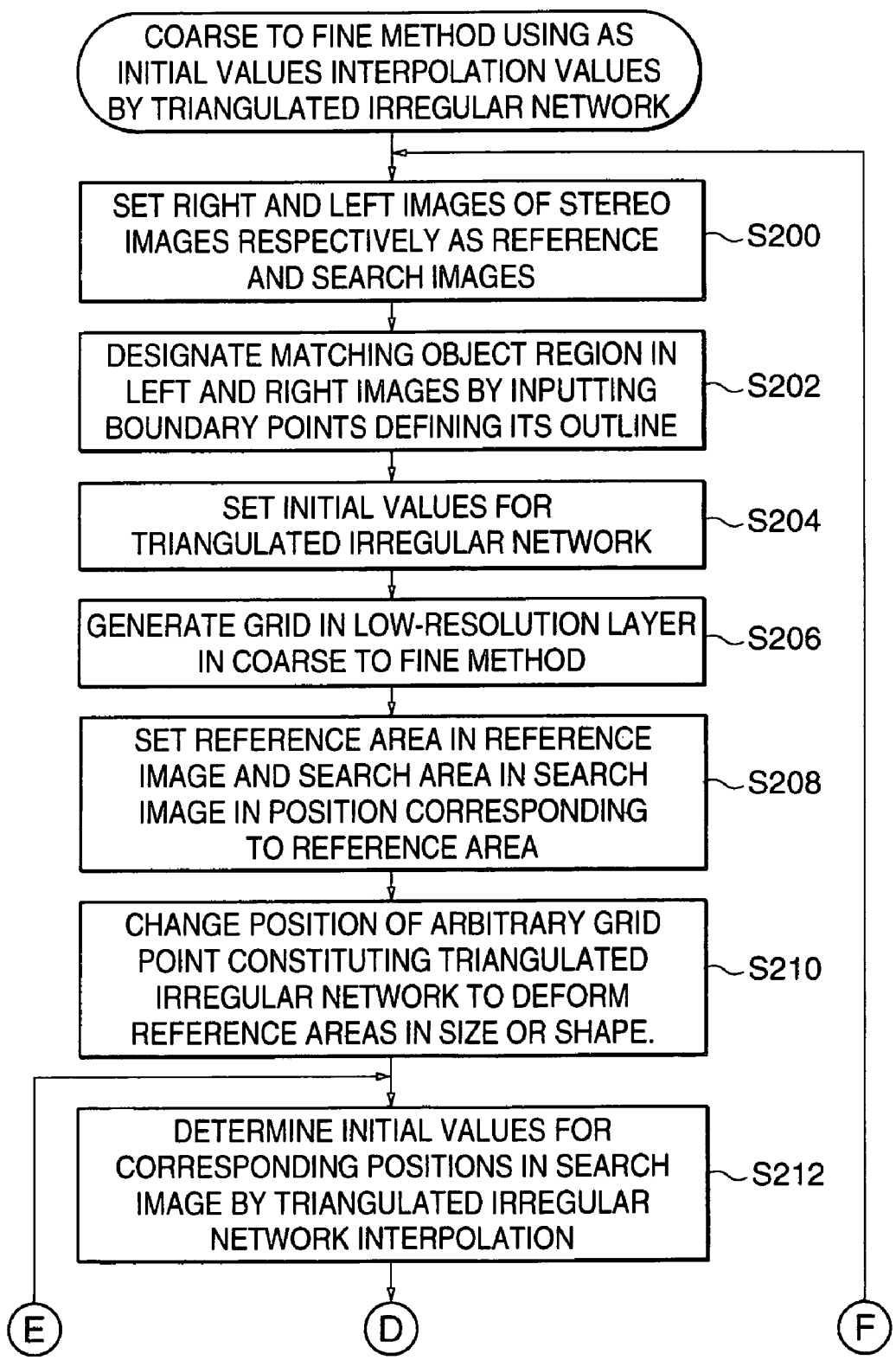
FIG. 16A and FIG. 16B are flowcharts for explaining the second embodiment of the present invention.
Figure 16B:
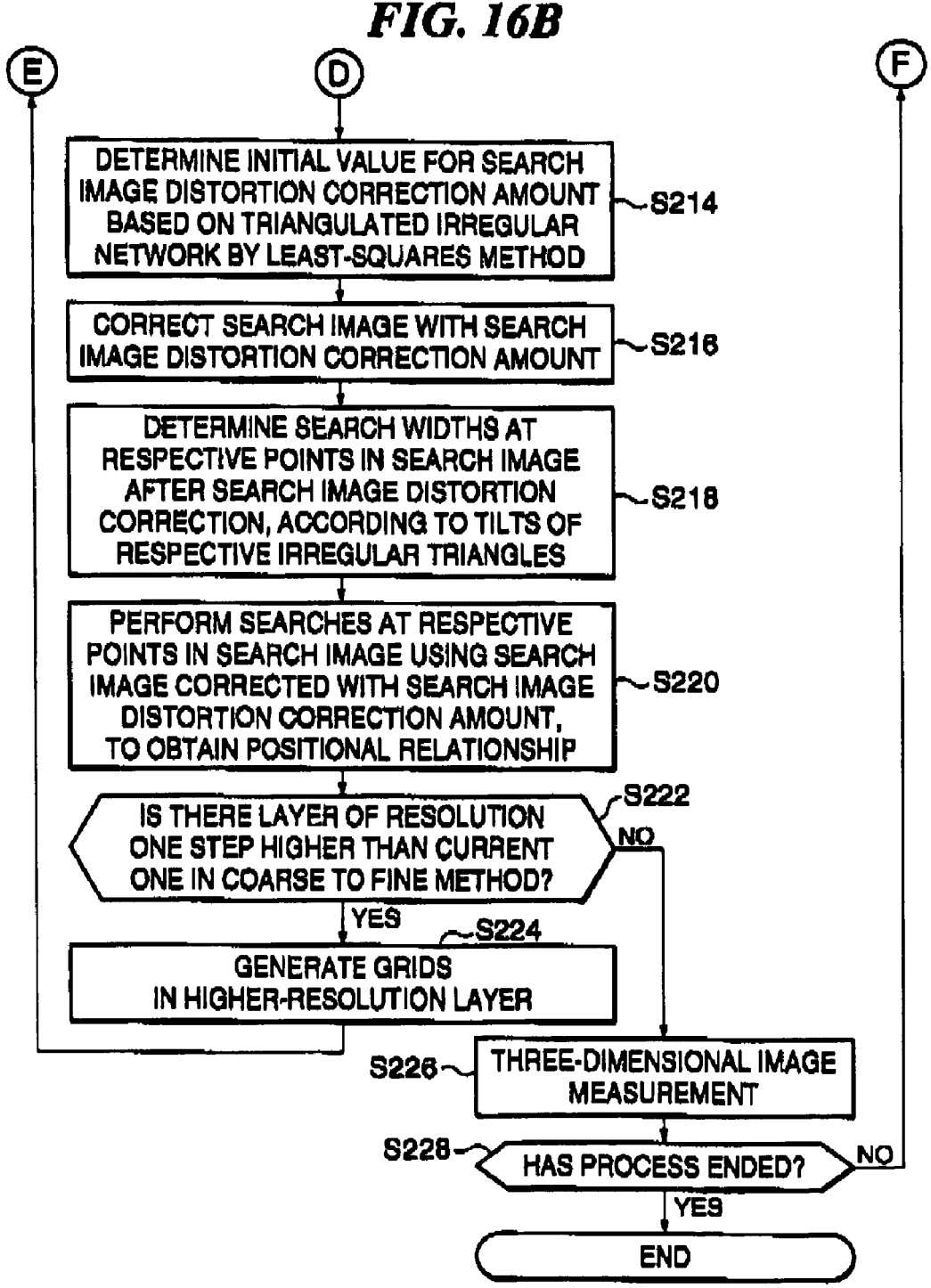

Using FIG. 16, a description is made of the operation of the image measuring device of FIG. 15. FIG. 16 is a flowchart for explaining a second embodiment of the present invention, explaining the combined operation of the coarse to fine method, the triangulated irregular network and the least-squares method. The image measuring device 70 captures a pair of stereo images 46 from the stereo image recording section 45, and the resolution-specific grid image forming section 52 sets a reference image 53 and a search image 54 with respect to the left and right images of the pair of stereo images 46 (step S200). A matching object region in the left and right images is designated by inputting boundary points defining its outline, for example by an operator (step S202).

Initial values for the triangulated irregular network are set, by the operator or an initial value setting function of the image measuring device 70 (step S204). The triangulated irregular network forming section 60 forms a triangulated irregular network that covers the reference image 53 and the search image 54 of the stereo images 46 by duplicating an irregular triangle two-dimensionally. The resolution-specific grid image forming section 52 generates a grid in the low-resolution layer in the coarse to fine method (step S206).

The image search area setting section 56 sets a reference area 57 in the reference image 53 of the pair of stereo images 46, and sets a search area 58 in the search image 54 of the stereo images 46 in a position corresponding to the reference area 57 (step S208). The reference area deforming section 72 changes a position of an arbitrary grid point constituting the triangulated irregular network to deform at least one of the reference areas 57 in at least one of size or shape (step S210). Initial values for corresponding positions between the reference image 53 and the search image 54 are obtained by triangulated irregular network interpolation (step S212). The corresponding area determining section 74 determines an initial value for a distortion correction amount for the search image 54 based on the triangulated irregular network by the least-squares method (step S214).

The search image distortion correcting section 62 corrects the search image 54 with the search image distortion correction amount obtained in step S214 (step S216). The search image distortion correcting section 62 determines search widths at respective points in the search image 54 after the search image distortion correction, according to the tilts of the respective irregular triangles (step S218).

The search image distortion correcting section 62 performs searches at respective points in the search image, using the search image corrected with the search image distortion correction amount (step S220). For example, the image search area setting section 56 sets a reference area 57 in the reference image 53 of the pair of stereo images 46, and sets a search area 58 in the search image 54 of the stereo images 46 in a position corresponding to the reference area 57.

The image measuring device 70 determines whether or not there exists a layer of a resolution one step higher than the current one in the coarse to fine method (step S222), and if there does, the resolution-specific grid image forming section 52 generates grids in the layer of the higher resolution (step S224), and the process returns to step S212. If necessary, the process may return to step S208, instead of step S212, to correct the reference area 57 in at least one of set position or shape based on the measurement results obtained by the triangulated irregular network forming section 60.

If the triangulated irregular network is formed up to the layer of the highest resolution in the coarse to fine method, the process branches from step S222 to step S226. The area shape measuring section 80 performs a three-dimensional image measurement at respective points, using the reference image 53 and the search image 54 where the image distortion is corrected, in both of which triangulated irregular networks are formed up to the highest-resolution layer (step S226), raising expectations for more precise measurement results. It is determined whether or not the process ends (step S228). When No, the process returns to step S200, and when Yes, the process ends.

As in the embodiments, 3D measurement data obtained from stereo images can be integrated and visualized with an image of a measuring object with a stereoscopic texture, with the availability of a three-dimensional image measuring apparatus implemented by a computer including an information processor such as a PC (personal computer), a display device such as an LCD (liquid crystal display) monitor, software for the three-dimensional image measuring apparatus installed on the PC, and a calibrated photographing device for photographing stereo images of the measuring object such as digital cameras. Thus, it is possible to construct an inexpensive system using an inexpensive general-purpose computer and monitor device, without the need for an expensive and precise stereoscopic system conventionally required to handle 3D data measured in stereo.

The measurement resolution in photogrammetry is determined by a base and height ratio B/H, which is a ratio of a distance between cameras B to a photographing distance H. However, in ground-based phogotrammetry, in some cases where an object with complicated projections and depressions is photographed with an increased base and height ratio, the stereo matching may fail under the influence of occlusion or projection distortion associated with relative height difference. Even in such cases of a complicated object, the application of the least-squares matching in the present embodiment allows sub-pixel image measurement by a stereo matching using images photographed with a reduced base and height ratio. With its algorithm integrating the TIN interpolation and the coarse to fine method, the present invention yields reliable results even for oblique images or images with deformation (magnification, rotation) due to the projection distortion of the object or the like.

The success or failure of the least-squares matching depends on the density levels of the left and right images and the texture in the window. Thus, the texture is preferably analyzed using the density values of the left and right images, as a preprocess before the least-squares matching of the present invention. In deforming the window, it is preferable that the image is sampled accurately, using a bilinear method or the like.

In digital photogrammetry, since the relationship between three-dimensional positions of TIN data obtained by the measurement of respective stereo models and photographed images are established by the orientation work, there is no need to synthesize TIN models or to perform alignment work for the texture. Since lens distortion and projection distortion of the cameras at the time of photographing are corrected with respect to the texture at the same time, the images used in the measurement can be texture-mapped with a resolution coincident with the measurement accuracy. The correspondence between the TIN models and the texture is maintained for each layer of resolution.

A resulting 3D model with a texture can be freely rotated and enlarged on a PC screen to allow confirmation of its surface shape in a real manner. This allows checking and editing of the measurement data without the use of a stereoscopic screen (3D monitor). In order to perform measurement to form a complicated all-around model of an architecture, a structure or the like, multiple images photographed from around are used to form a TIN model for each stereo model. In this case, since TIN models are automatically synthesized in correct positions in the same coordinate system, it is possible to proceed with the work while confirming the measurement data.

APIs (Application Programming Interfaces) for realizing fast 3D graphics in Windows (registered trademark) environments include OpenGL developed mainly by Silicon Graphics, Inc. and Direct3D developed by Microsoft Corporation, which are currently in wide use in many CG software products, CAD software products, game software products and the like. Both allow significantly fast graphics drawing when a video card with a 3D acceleration function is installed in a personal computer.

The following are reference numerals for major components used in the descriptions above. 41: measuring object; 46: stereo images; 50, 70: image measuring device; 51: approximate position measuring section; 52: resolution-specific grid image forming section; 53: reference image (one image); 54: search image (other image); 55: image processing section; 56: image search area setting section; 57: reference area; 58: search area; 59: corresponding reference area; 60: triangulated irregular network forming section (unitary geometric shape network forming section); 61: triangulated irregular network data; 62: search image distortion correcting section; 64, 74: corresponding area determining section; 66, 80: area shape measuring section; 67, 82: image rebuilding section; 68, 84: left/right image correspondence database; 72: reference area deforming section.

What is claimed is:

1. A three-dimensional image measuring apparatus, including a computer, comprising:

a resolution-specific grid image forming section of the computer for generating reference images and search images sequentially from high-resolution images to low-resolution images with respect to a pair of stereo images, wherein approximate positions of the search images corresponding to points of the reference images are extracted using the low-resolution images, and then more precise positions thereof are sequentially extracted using the high-resolution images;

an area setting section of the computer for setting a reference area in the reference images of the pair of stereo images and a search area in the search images of the stereo images in a position corresponding to the reference area;

a unitary geometric shape network forming section of the computer for forming a unitary geometric shape network that covers the reference image and the search image of the stereo images by duplicating a unitary geometric shape two-dimensionally, wherein the reference area and the search area set by the area setting section are of the unitary geometric shape and forming sequentially a finer geometric shape from a coarser geometric shape for an image distortion correction, wherein the initial values of corresponding points of the high resolution images are obtained by interpolation using values for known points of the low resolution images;

a search image distortion correcting section of the computer for applying an image distortion correction to either one of the images according to positional relationship between the reference area and the search area corresponding to the reference area, correcting a distortion of the search area shape with respect to the reference area according to positional relationship between the reference area and the search area, determining search widths at respective points in the search image after the search image distortion correction according to tilts of the respective unitary geometric shapes and obtaining positional relationship between the reference area and the search area corresponding to the reference area, using one image of the pair of stereo images and an other image of the pair of stereo images corrected by the image distortion correction; and an area shape measuring section of the computer for measuring a shape of a measuring object photographed in the stereo images based on the reference area in the one image and the search area in the other image, to either one of which the image distortion correction has been applied.

2. The three-dimensional image measuring apparatus according to claim 1, further comprising:

a corresponding area determining section of the computer for determining, by a correlation process, a corresponding reference area corresponding to the reference area set by the area setting section, wherein the area setting section sets the corresponding reference area obtained by the corresponding area determining section as the search area in the other image corresponding to the reference area.

3. The three-dimensional image measuring apparatus according to claim 2,
wherein the search image distortion correcting section is configured to determine an image distortion correction amount applied to an adjacent search area positioned near the search area based on information on the adjacent search area corresponding to an adjacent reference area.

4. The three-dimensional image measuring apparatus according to claim 1,
wherein the search image distortion correcting section is configured to determine an image distortion correction amount applied to an adjacent search area positioned near the search area based on information on the adjacent search area corresponding to an adjacent reference area.

5. The three-dimensional image measuring apparatus according to claim 1,
wherein the search image distortion correcting section determines an image distortion correction amount applied to each search area provided in the other image such that image distortions in the one image and the other image of the pair of stereo images are equal to each other.

6. A three-dimensional image measuring method implemented on a computer, comprising the steps of:
generating, via the computer, reference images and search images sequentially from high-resolution images to low-resolution images with respect to a pair of stereo images, wherein approximate positions of the search images corresponding to points of the reference images are extracted using the low-resolution images, and then more precise positions thereof are sequentially extracted using the high-resolution images;
setting, via the computer, a reference area in one image of the pair of stereo images and a search area in an other image of the stereo images in a position corresponding to the reference area;
forming, via the computer, a unitary geometric shape network that covers the reference image and the search image of the pair of the stereo images by duplicating a unitary geometric shape two-dimensionally, wherein the reference area and the search area are of the unitary geometric shape;
forming, via the computer, sequentially a finer geometric shape from a coarser geometric shape for an image distortion correction, wherein the initial values of corresponding points of the high resolution images are obtained by interpolation using values for known points of the low resolution images;
correcting, via the computer, the other image using an image distortion correction amount obtained from positional relationship between the reference images and the search images of the stereo images of the unitary geometric shape network;
correcting, via the computer, a distortion of the search area shape with respect to the reference area according to the positional relationship between the reference area and the search area;
determining, via the computer, search widths at respective points in the search image after the search image distortion correction according to tilts of the respective unitary geometric shapes;
obtaining, via the computer, positional relationship between the reference area and the search area corresponding to the reference area, using the one image and the other image corrected by the image distortion correction amount; and
measuring, via the computer, a shape of a measuring object photographed in the stereo images based on the reference area in the one image on which the unitary geometric shape network is formed and the search area in the other image which has been corrected.

7. A three-dimensional image measuring apparatus, including a computer, comprising:
a resolution-specific grid image forming section of the computer for generating reference images and search images sequentially from high-resolution images to low-resolution images with respect to a pair of stereo images, wherein approximate positions of the search images corresponding to points of the reference images are extracted using the low-resolution images, and then more precise positions thereof are sequentially extracted using the high-resolution images;
an area setting section of the computer for setting a reference area in the reference images of a pair of stereo images and a search area in the search images of the stereo images in a position corresponding to the reference area;
a unitary geometric shape network forming section of the computer for forming a unitary geometric shape network that covers the reference image and the search image of the stereo images by duplicating a unitary geometric shape two-dimensionally, wherein the reference area and the search area set by the area setting section are of the unitary geometric shape and forming sequentially a finer geometric shape from a coarser geometric shape for an image distortion correction, wherein the initial values of corresponding points of the high resolution images are obtained by interpolation using values for known points of the low resolution images;
a reference area deforming section of the computer for deforming the reference area in at least one of size or shape;
a corresponding area determining section of the computer for determining, by a correlation process, the search area corresponding to the reference area set by the area setting section or deformed by the reference area deforming section;
a search image distortion correcting section of the computer for applying a predetermined image distortion correction to an other image of the pair of stereo images according to positional relationship between the reference area and the search area corresponding to the reference area, and obtaining positional relationship between the reference area and the search area corresponding to the reference area, using one image of the pair of stereo images and the other image corrected by the image distortion correction; and
an area shape measuring section of the computer for measuring a shape of a measuring object photographed in the stereo images based on the reference area in the one image and the search area in the corrected other image.

8. The three-dimensional image measuring apparatus according to claim 7,
wherein the reference area deforming section is configured to correct the reference area in at least one of set position or shape based on measurement results obtained by the area shape measuring section.

9. A three-dimensional image measuring method implemented on a computer, comprising the steps of:

generating, via the computer, reference images and search images sequentially from high-resolution images to low-resolution images with respect to a pair of stereo images, wherein approximate positions of the search images corresponding to points of the reference images are extracted using the low-resolution images, and then more precise positions thereof are sequentially extracted using the high-resolution images;

setting, via the computer, a reference area in one image of the pair of stereo images and a search area in an other image of the stereo images in a position corresponding to the reference area;

forming, via the computer, a unitary geometric shape network that covers the one image and the other image of the pair of the stereo images by duplicating a unitary geometric shape two-dimensionally, wherein the reference area and the search area set by the area setting section are of the unitary geometric shape;

forming, via the computer, sequentially a finer geometric shape from a coarser geometric shape for an image distortion correction, wherein the initial values of corresponding points of the high resolution images are obtained by interpolation using values for known points of the low resolution images;

changing, via the computer, a position of an arbitrary grid point constituting the unitary geometric shape network to deform at least one of the reference areas in at least one of size or shape;

correcting, via the computer, the other image using an image distortion correction amount obtained from positional relationship between the reference images and the search images with the set reference area or with the reference area with the deformed size or shape;

obtaining, via the computer, positional relationship between the reference area and the search area corresponding to the reference area, using the one image and the other image corrected with the image distortion correction amount; and measuring, via the computer, a shape of a measuring object photographed in the stereo images based on the reference area in the one image on which the unitary geometric shape network is formed and the search area in the other image which has been corrected.

* * * * *